United States Patent
Uhm et al.

(10) Patent No.: US 12,387,438 B2
(45) Date of Patent: Aug. 12, 2025

(54) ELECTRONIC DEVICE FOR PROVIDING AUGMENTED REALITY CONTENT AND OPERATION METHOD THEREOF

(71) Applicant: SAMSUNG ELECTRONICS CO., LTD., Suwon-si (KR)

(72) Inventors: Junwhon Uhm, Suwon-si (KR); Geonho Yoon, Suwon-si (KR); Jinchoul Lee, Suwon-si (KR); Heonjun Ha, Suwon-si (KR); Seungnyun Kim, Suwon-si (KR); Hyunsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 18/122,459

(22) Filed: Mar. 16, 2023

(65) Prior Publication Data
US 2023/0222744 A1 Jul. 13, 2023

Related U.S. Application Data

(63) Continuation of application No. PCT/KR2021/011665, filed on Aug. 31, 2021.

(30) Foreign Application Priority Data

Sep. 16, 2020 (KR) .................. 10-2020-0119179

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/013* (2013.01); *G06V 10/761* (2022.01); *G06V 40/193* (2022.01); *G06V 2201/07* (2022.01)

(58) Field of Classification Search
CPC ..... G06T 19/006; G06F 3/013; G06F 3/0482; G06F 3/04883; G06F 3/04815;
(Continued)

(56) References Cited

U.S. PATENT DOCUMENTS 7,946,707 B1 * 5/2011 McDonald, II ........ A61B 3/032
351/203
9,723,982 B2 * 8/2017 Haddadi ................ A61B 3/145
(Continued)

FOREIGN PATENT DOCUMENTS

JP 2013-250882 A 12/2013
JP 2017-67876 A 4/2017
(Continued)

OTHER PUBLICATIONS

Green, D. G., Powers, M. K., & Banks, M. S. (1980). Depth of focus, eye size and visual acuity. Vision research, 20(10), 827-835.*
(Continued)

*Primary Examiner* — Sarah Lhymn
(74) *Attorney, Agent, or Firm* — Sughrue Mion, PLLC

(57) ABSTRACT

An electronic device includes a first camera module; a display for displaying an augmented reality content; a processor operatively connected to the first camera module and the display; and a memory operatively connected to the at least one processor and storing instructions and dominant eye correction information. The processor performs a dominant eye determination operation of a user of the electronic device identifying a first position of a first object during the dominant eye determination operation; identifies a second position of the first object by using the first camera module; recognizes, as a selected point, a point moved, by a first correction value determined on the basis of the dominant eye correction information, from a first reference point displayed on the augmented reality content during the dominant deter-
(Continued)

mination operation; and selects a second object on the augmented reality content corresponding to the selected point.

18 Claims, 12 Drawing Sheets

(51) Int. Cl.
*G06V 10/74* (2022.01)
*G06V 40/18* (2022.01)

(58) Field of Classification Search
CPC .......... G06V 10/761; G06V 40/193; G06V 2201/07; G06V 20/20; G02B 2027/0138; G02B 2027/0187; G02B 27/0172
See application file for complete search history.

(56) References Cited

U.S. PATENT DOCUMENTS

| | | | |
|---|---|---|---|
| 9,940,518 B1* | 4/2018 | Klingström | G06V 40/193 |
| 2012/0027267 A1 | 2/2012 | Kim et al. | |
| 2012/0092369 A1 | 4/2012 | Kim et al. | |
| 2014/0191927 A1 | 7/2014 | Cho | |
| 2014/0362446 A1 | 12/2014 | Bickerstaff et al. | |
| 2015/0128064 A1* | 5/2015 | Fleming | G06F 3/0484 715/744 |
| 2016/0170603 A1* | 6/2016 | Bastien | H04N 13/254 348/49 |
| 2016/0284129 A1* | 9/2016 | Nishizawa | G06F 3/013 |
| 2017/0068387 A1* | 3/2017 | Bathiche | G02B 27/0093 |
| 2017/0160550 A1 | 6/2017 | Kobayashi et al. | |
| 2018/0035097 A1* | 2/2018 | Ohishi | G06T 7/11 |
| 2018/0081429 A1* | 3/2018 | Akenine-Moller | G06F 3/013 |
| 2020/0026362 A1 | 1/2020 | Kim et al. | |
| 2020/0228791 A1* | 7/2020 | Kusafuka | G02B 30/30 |
| 2021/0084278 A1* | 3/2021 | Harviainen | H04N 13/332 |
| 2021/0089121 A1* | 3/2021 | Rönngren | G02B 27/0093 |
| 2021/0090337 A1* | 3/2021 | Ravasz | G06T 19/006 |
| 2021/0096368 A1* | 4/2021 | Carlsson | G02B 27/0172 |
| 2021/0263308 A1* | 8/2021 | Watabe | G02B 27/0093 |
| 2022/0192487 A1* | 6/2022 | Kim | A61B 3/14 |

FOREIGN PATENT DOCUMENTS

| | | |
|---|---|---|
| KR | 10-2012-0032062 A | 4/2012 |
| KR | 10-2012-0040407 A | 4/2012 |
| KR | 10-2014-0090968 A | 7/2014 |
| KR | 10-2016-0019964 A | 2/2016 |
| KR | 10-2016-0024487 A | 3/2016 |
| KR | 10-2016-0123346 A | 10/2016 |
| KR | 10-2017-0031223 A | 3/2017 |
| KR | 10-1947372 B1 | 5/2019 |
| KR | 10-2019-0106939 A | 9/2019 |
| KR | 10-2194816 B1 | 12/2020 |
| KR | 10-2022-0030806 A | 3/2022 |

OTHER PUBLICATIONS

International Search Report (PCT/ISA/210) dated Dec. 10, 2021 issued by the International Searching Authority in International Application No. PCT/KR2021/011665.
Written Opinion (PCT/ISA/237) dated Dec. 10, 2021 issued by the International Searching Authority in International Application No. PCT/KR2021/011665.
Communication issued Jun. 16, 2025 by the Korean Intellectual Property Office in Korean Patent Application No. 10-2020-0119179.
Green, Daniel G. et al., "Depth of Focus, Eye Size and Visual Acuity", Vision Research, vol. 20, Issue 10, 1980, pp. 827-835. (9 pages total).

* cited by examiner

ELECTRONIC DEVICE FOR PROVIDING AUGMENTED REALITY CONTENT AND OPERATION METHOD THEREOF

CROSS-REFERENCE TO RELATED APPLICATIONS

This application is a continuation application of International Application No. PCT/KR2021/011665, filed on Aug. 31, 2021, which is based on and claims priority to Korean Patent Application No. 10-2020-0119179, filed on Sep. 16, 2020, in the Korean Intellectual Property Office, the disclosures of which are incorporated by reference herein in their entireties.

BACKGROUND

1. Field

The disclosure relates to an electronic device providing augmented reality content and an operation method thereof, and more particularly, to an electronic device providing correction to selection of augmented reality content based on a dominant eye of a user.

2. Description of Related Art

Augmented reality (AR) is a technology of superimposing virtual information on a real image displayed on a display device of an electronic device.

With the development of a wearable device, for example, a head mounted display (HMD), an electronic device may recognize an external environment viewed by a user and provide augmented reality content reflecting the external environment.

Conventional AR devices use a controller or a user's gesture to select an object. For example, the electronic device displays a virtual extension line extending from a controller or the body (e.g., hand) of a user, and allows the object to be selected by matching the direction of the virtual extension line with the direction of the object. The direction which the user actually points to and the direction which the electronic device (virtual extension line) points to may be different, giving a sense of difference to the user, and causing an unnecessary increase in current consumption due to the virtual extension line being always displayed on a display.

As another example, an electronic device worn on a user's head may locate a pointer in front of the user without a virtual extension line and change the position of the pointer as the user moves the head. In this case, it is inconvenient for the user to move his or her head to select the object.

SUMMARY

According to an embodiment disclosed herein, an electronic device may include a first camera module, a display that displays an augmented reality content, at least one processor operatively connected to the first camera module and the display, and a memory operatively connected to the at least one processor and configured to store instructions and dominant eye correction information. The at least one processor is configured to execute the instructions to perform a dominant eye determination operation of determining a dominant eye of a user of the electronic device, and identify a first position of a first object during the dominant eye determination operation, identify a second position of the first object by using the first camera module, recognize, as a selected point, a point moved by a first correction value from a first reference point displayed on the augmented reality content during the dominant eye determination operation, the first correction value being determined based on the dominant eye correction information, and select a second object on the augmented reality content corresponding to the selected point.

According to an embodiment disclosed herein, an operation method of an electronic device for providing augmented reality content may include determining a dominant eye of a user of the electronic device, and identifying a first position of a first object when determining the dominant eye, identifying a second position of the first object by using a first camera module, recognizing, as a selected point, a point moved by a first correction value from a first reference point displayed on the augmented reality content when determining the dominant eye, the first correction value being determined based on dominant eye correction information stored in a memory, and selecting a second object on the augmented reality content corresponding to the selected point.

According to one or more embodiments disclosed herein, an electronic device for providing augmented reality content and operation method thereof may improve the accuracy of selection of an object on augmented reality content by correcting the direction or position recognized by the electronic device with respect to the direction or position which a user points to.

In addition, various effects identified directly or indirectly through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
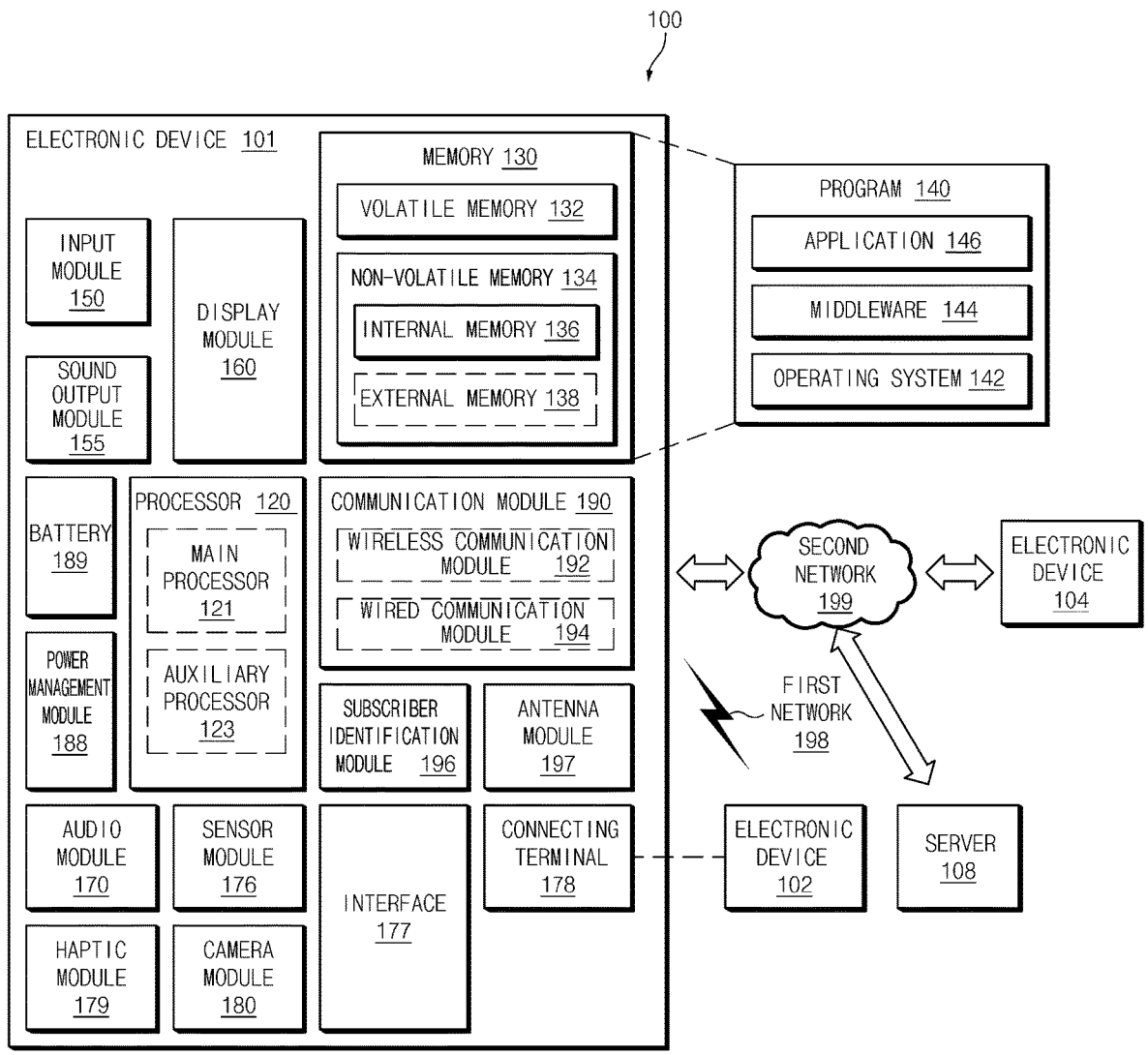
FIG. 1 is a block diagram illustrating an electronic device in a network environment according to various embodiments.

Hereinafter, various embodiments of the disclosure may be described with reference to accompanying drawings.

Accordingly, those of ordinary skill in the art will recognize that modification, equivalent, and/or alternative on the various embodiments described herein can be variously made without departing from the scope and spirit of the disclosure. In the drawings, the same or similar reference numerals may be used for the same or similar elements.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, a configuration of an electronic device according to an exemplary embodiment will be described with reference to FIG. 2.

Figure 2:
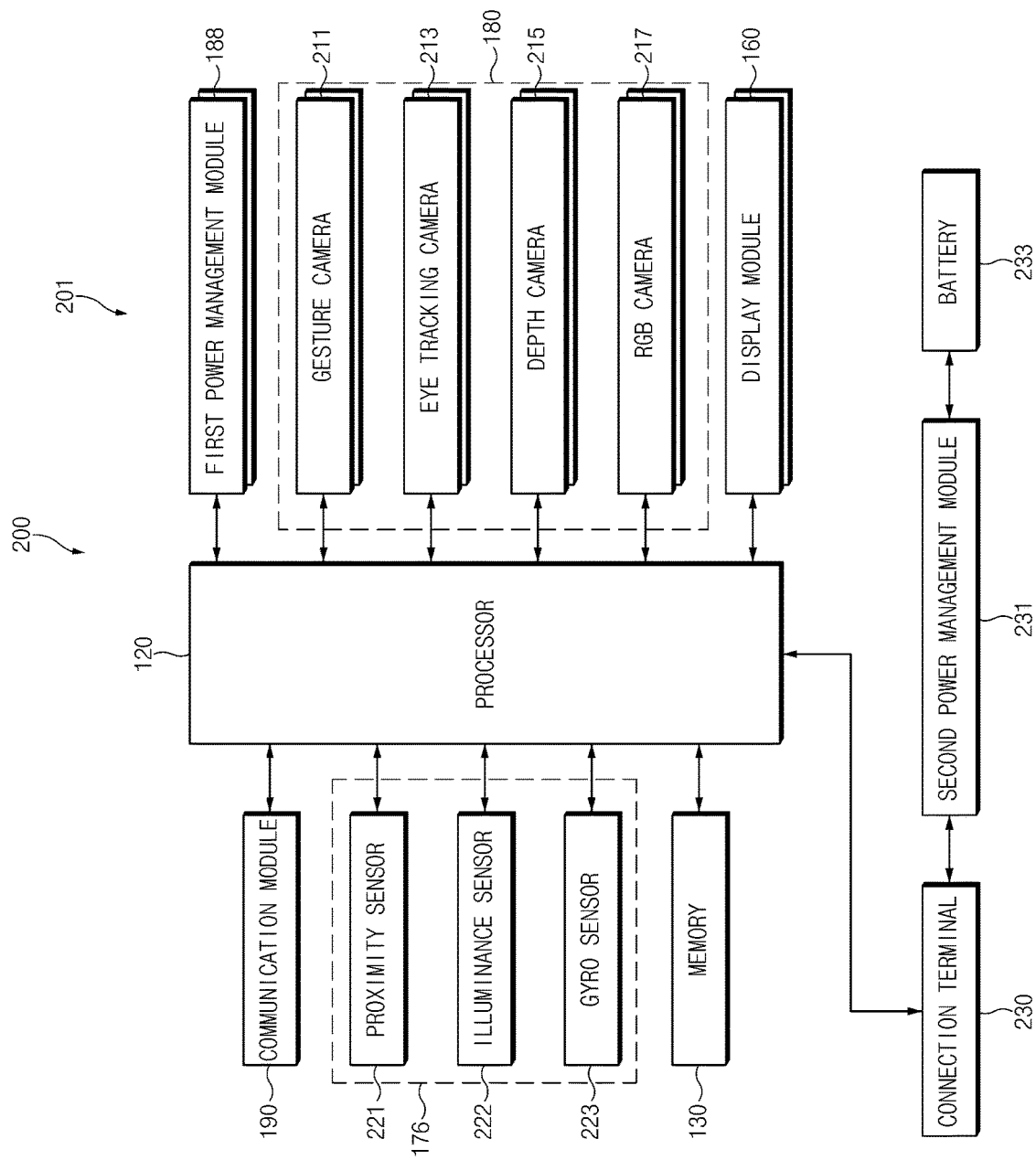
FIG. 2 is a block diagram illustrating an electronic device according to an embodiment.

FIG. 2 is a block diagram 200 illustrating an electronic device according to an embodiment of the disclosure. According to an embodiment, an electronic device 201 may be the electronic device 101 of FIG. 1, or a similar device comprising a subset of the components of the electronic device 101 of FIG. 1.

Referring to FIG. 2, an electronic device 201 according to an embodiment may include the processor 120 (e.g., the processor 120 of FIG. 1), the communication module 190 (e.g., the communication module 190 of FIG. 1), the power management module 188 (e.g., the power management module 188 of FIG. 1), the sensor module 176 (e.g., the sensor module 176 of FIG. 1), the camera module 180 (e.g., the camera module 180 of FIG. 1), the memory 130 (e.g., the memory 130 of FIG. 1), and/or the display module 160 (e.g., the display module 160 of FIG. 1). According to an embodiment, the electronic device 201 may be connected to a second power management module 231 through a connection terminal 230 (e.g., USB TYPE-C).

According to an embodiment, the electronic device 201 may be a wearable device which a user is able to wear on a part of the user's body. For example, the electronic device 201 may be worn on the user's head. In this case, the display module 160 of the electronic device may include a head mounted display (HMD). Hereinafter, it may be assumed that the electronic device 201 to be described below is an electronic device that is worn on the user's head and has a head-mounted display located in front of the user's eyes when worn, although the device is not limited thereto. A direction the user looks at when the user wears the electronic device 201 may be referred to as a first direction, and a direction opposite to the first direction and toward the user may be referred to as a second direction.

According to an embodiment, the processor 120 may execute a program (e.g., the program 140 of FIG. 1) stored in the memory 130 to control at least one other component (e.g., hardware or software component) and perform various data processing or operations. According to an embodiment, the processor 120 may provide an augmented reality service to a user. The processor 120 may output at least one virtual object through the display module 160 such that the at least one virtual object is superimposed on a real space corresponding to a viewing angle of the user wearing the electronic device 201. According to an embodiment, content including a real space and at least one virtual object which is displayed through the display module 160 may be referred to as augmented reality content. For example, the display module 160 may display augmented reality content generated by the electronic device 201 or another electronic device (e.g., the electronic device 102 or 104 of FIG. 1 or the server 108 of FIG. 1) through the communication module 190.

According to an embodiment, the display module 160 of the electronic device 201 may include at least one display panel (e.g., a first display panel and/or a second display panel). The display panel may be composed of transparent elements such that a user is able to perceive a real space through the display module 160. The display module 160 may display at least one virtual object on at least a portion of the display panel such that the user wearing the electronic device 201 is able to see the virtual object as being added to the real space. For example, the viewing angle of the user may include an angle at or range in which the user is able to recognize an object.

According to an embodiment, the sensor module 176 of the electronic device 201 may include a proximity sensor 221, an illuminance sensor 222, and/or a gyro sensor 223. According to an embodiment, the proximity sensor 221 may detect an object adjacent to the electronic device 201. The illuminance sensor 222 may measure a degree of brightness around the electronic device 201. According to an embodiment, the gyro sensor 223 may detect the posture and position of the electronic device 201. For example, the gyro sensor 223 may detect whether the electronic device 201 is properly worn on the user's head. For another example, the gyro sensor 223 may detect movement of the electronic device 201 or user wearing the electronic device 201.

According to an embodiment, the electronic device 201 may perform wireless communication with other electronic devices (e.g., the electronic devices 102 and 104 of FIG. 1) through the communication module 190 (e.g., a wireless communication circuit). For example, the electronic device 201 may perform wireless communication with a portable electronic device (e.g., a smart phone), and the electronic device 201 may be partially controlled by another external electronic device (e.g., a portable electronic device). For example, the electronic device 201 may perform at least one function under the control of the another external electronic device.

According to an embodiment, the camera module 180 of the electronic device 201 may include a gesture camera 211, an eye tracking camera 213, and a depth camera 215, and/or an RGB camera 217. According to an embodiment, the gesture camera 211 may detect movement of the user. For example, at least one or more gesture cameras 211 may be disposed in the electronic device 201 and may detect a hand movement of the user within a preset distance. The gesture camera 211 may include a SLAM camera (simultaneous localization and mapping camera) for recognizing information (e.g., position and/or direction) related to a surrounding space of the electronic device 201. A gesture recognition area of the gesture camera 211 may be set based on a range in which the gesture camera 211 is able to make a capture. According to an embodiment, the eye tracking camera 213 may track movements of the user's left and right eyes. According to an embodiment, the processor 120 may identify a gaze direction of the left eye and a gaze direction of the right eye using the eye tracking camera 213. According to an embodiment, the processor 120 may determine a dominant eye and a non-dominant eye based on the gaze direction of the left eye and the gaze direction of the right eye. According to an embodiment, the depth camera 215 may measure a distance to an object located in front of the electronic device 201. The depth camera 215 may include a time of flight (TOF) camera and/or a depth camera. According to an embodiment, the electronic device 201 may recognize one of objects located in the user's gaze direction (e.g., field of view, or FOV) in which the user looks at, using the eye tracking camera 213, and calculate a depth for a distance to a corresponding object through the depth camera, or measure the distance to the corresponding object through a TOF camera. According to an embodiment, the RGB camera 217 may detect color related information of an object and distance information to the object. According to an embodiment, the gesture camera 211, the eye tracking camera 213, the depth camera 215, and/or the RGB camera 217 included in the camera module 180 each may be included in the electronic device 201, or some or all thereof may be implemented as an integrated camera. For example, the depth camera 215 and the RGB camera 217 may be implemented as one integrated camera. According to an embodiment, the camera module 180 may be disposed to capture the first direction at a position corresponding to the user's eyes when the user wears the electronic device 201. According to an embodiment, the camera module 180 may capture an image in a direction which the user is looking at.

According to an embodiment, the camera module 180 may recognize an external object located in the direction which the user is looking at. For example, the external object recognized by the camera module 180 may be a part of the user's body such as the user's hand or a certain object.

According to an embodiment, the camera module 180 may identify the position of an external object. For example, the camera module 180 may identify a relative position of an object with respect to the electronic device. As another example, the camera module 180 may identify a position of another external object based on any one external object recognized by the camera module 180.

According to an embodiment, the camera module 180 may identify a position of the user's finger. For example, the camera module 180 may identify the position of a finger based on the tip (e.g., the tip of a fingernail) of a finger making a pointing motion among the user's hand. According to an embodiment, the processor 120 may store the identified position of the user's finger in the memory 130. For example, the processor 120 may display virtual content (e.g., a dot or a finger icon) on the tip of the user's finger (e.g., the tip of a fingernail) recognized on augmented reality content to enable the user to easily identify the tip of the user's finger.

According to an embodiment, the camera module 180 may capture the eyes of the user of the electronic device 201, and the processor 120 may detect at least one of the size and position of the user's pupil using the camera module 180.

According to an embodiment, the size of the user's pupil may vary according to the depth of an object located in the gaze direction in which the user is looking at. According to an embodiment, the processor 120 may determine a distance value based on the size of the pupil of the user of the electronic device 201, which is detected using the camera module 180. According to an embodiment, the distance value may refer to a distance from the electronic device 201 or the user of the electronic device 201 to a point which the user is looking at. For example, the distance value may mean a depth of an object located in the gaze direction in which the user is looking at.

According to various embodiments, the position of the pupil may vary according to the position of the object the user is looking at. According to an embodiment, the processor 120 may further identify the position of the pupil of the user of the electronic device 201, which is detected using the camera module 180. For example, the position of the pupil may include a position moved left or right relative to the center (or central point) of one of both eyes (left and right eyes) of the user.

According to an embodiment, the power management modules 188 and 231 may manage power supplied to the electronic device 201. The power management modules 188 and 231 may include the first power management module 188 that is directly connected to the processor 120 to supply power and the second power management module 231 that supplies power via the connection terminal 230 (e.g., TYPE-C). The second power management module 231 may be functionally connected to a battery 233 to manage a larger amount of power. According to an embodiment, the electronic device 201 may drive at least one camera included in the camera module 180 using power supplied from the power management module 188 or 231. The electronic device 201 may manage power consumption by adjusting display information provided via the display module 160 based on information acquired using the at least one camera.

The number and position of at least one camera (e.g., the gesture camera 211, the eye tracking camera 213, the depth camera 215, and/or the RGB camera 217) included in the electronic device 201 are not limited to that of the embodiment shown in FIG. 2. For example, the number and position of at least one camera may vary based on the shape (e.g., shape or size) of the electronic device 201.

According to an embodiment, the processor 120 may provide information on an object to the user through the display module 160, the object being selected in response to a user's selection input for a virtual object or a real object detected through the camera module 180.

According to an embodiment, a method to be performed by the electronic device 201, or the processor 120 of the electronic device 201, will be described in detail with reference to FIGS. 3 to 10B.

Hereinafter, an operation of an electronic device according to an embodiment will be described with reference to FIG. 3.

Figure 3:
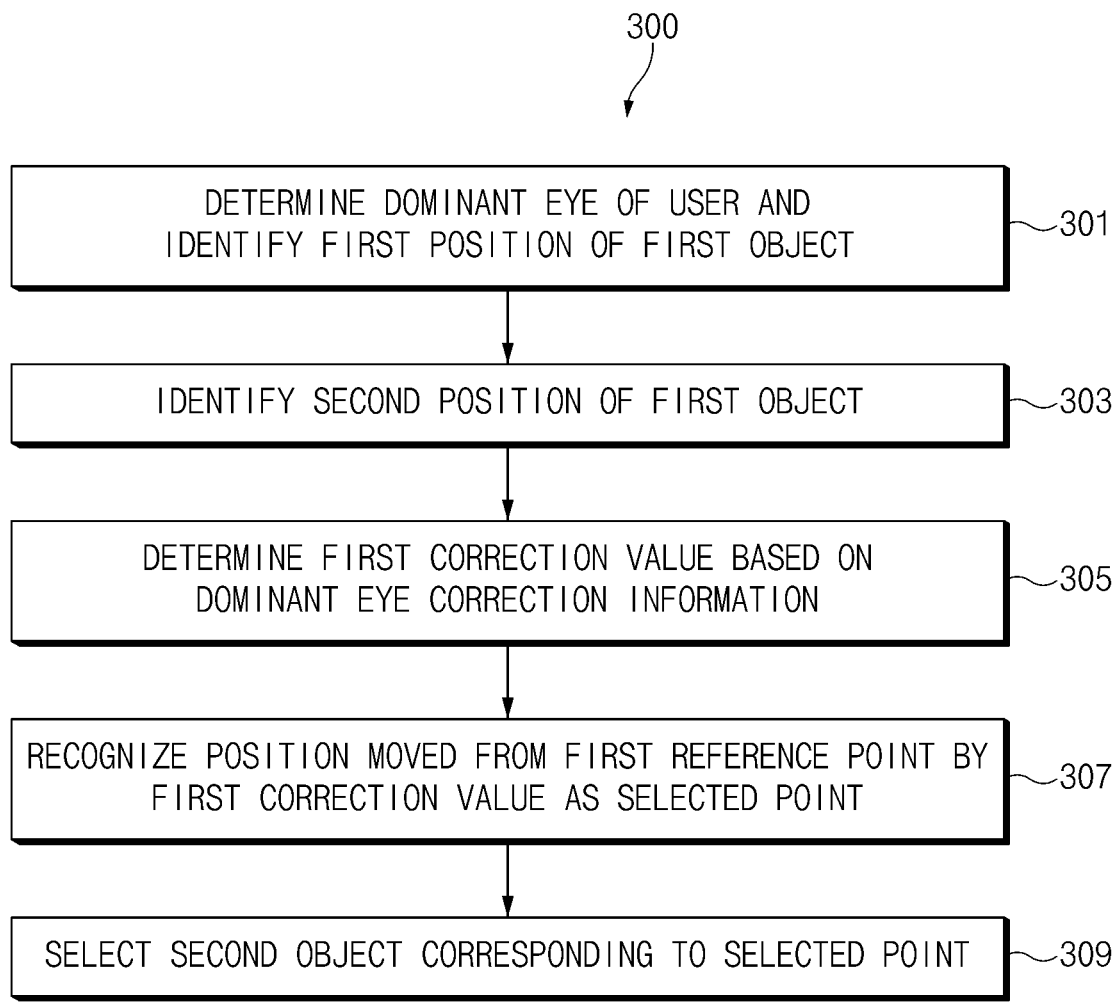
FIG. 3 is a flowchart illustrating a method for operating an electronic device according to an embodiment.

FIG. 3 is a flowchart 300 illustrating a method for operating an electronic device according to an embodiment. The operations of the electronic device to be described below may be performed by the electronic device 201 of FIG. 2, or by the processor 120 of the electronic device 201.

In operation 301, the electronic device may determine a user's dominant eye. For example, the dominant eye may refer to an eye primarily used when the user looks at a specific object, and the non-dominant eye may refer to an eye used secondarily when the user looks at the specific object. The user's dominant eye and non-dominant eye may be identified through inspection or testing, and the user may be aware of which of their eyes respectively corresponds to the dominant eye and the non-dominant eye. Users have different dominant eyes among the right eye and the left eye, and for example, when the right eye is the dominant eye, the left eye may be regarded as the non-dominant eye. Conversely, when the left eye is the dominant eye, the right eye may be regarded as the non-dominant eye. According to an embodiment, when a user recognizes a real space, the user may look at the real space based on the field of view of an eye corresponding to the dominant eye. According to an embodiment, the electronic device may determine which eye of the user's right eye and left eye is the dominant eye.

According to an embodiment, the electronic device may include an eye tracking camera (e.g., the eye tracking camera 213 of FIG. 2) for tracking the direction of the user's eyes and a depth camera (e.g., the depth camera 215 of FIG. 2) for measuring a distance to an object. The eye tracking camera 213 may include a plurality of eye tracking cameras respectively corresponding to both eyes of the user. For example, the eye tracking camera 213 may include a first eye tracking camera corresponding to the user's left eye and a second eye tracking camera corresponding to the user's right eye. According to an embodiment, the eye tracking camera 213 may detect reflected light, which is light reflected by the user's eyes, under the control of the processor 120. The eye tracking camera 213 may convert the detected reflected light into an electrical signal. The processor 120 may obtain an image of the user's eyeball through the converted electrical signal. The processor 120 may track the user's eyes using the obtained eyeball image of the user. For example, the processor 120 may track the user's eyes based on the position and movement of the reflected light detected through the eye tracking camera 213.

According to an embodiment, the processor of the electronic device may identify gaze directions of the user's left eye and right eye which are the both eyes of the user, using at least one camera. For example, the processor may detect gaze directions of the left and right eyes using the eye tracking camera 213 included in the camera module. According to an embodiment, the processor may calculate a distance to an object located in a real space using at least one depth camera, and detect a gaze direction of the user using at least one eye tracking camera. When the user gazes at an object located in the front, the processor may determine which pupil of the left eye or the right eye gazes at the object.

According to an embodiment, the processor may determine a dominant eye and/or a non-dominant eye among both eyes (e.g., left eye and/or right eye) of the user based on the identified gaze direction.

According to an embodiment, the processor may identify the dominant eye and/or the non-dominant eye of the user based on information related to the dominant eye and/or the non-dominant eye stored in the memory, or may identify the dominant eye and/or the non-dominant eye of the user through a direct input from the user. For example, the processor may provide a user interface through which a user is able to input information on the dominant eye and the non-dominant eye.

According to an embodiment, the electronic device may determine the degree of skew between the dominant eye and the non-dominant eye based on the gaze direction identified in operation 301. In other words, the electronic device according to an embodiment may determine a degree of dominance of the dominant eye. In various embodiments of the disclosure, the degree of skew between the dominant eye and the non-dominant eye or the degree of dominance of the dominant eye may be differently referred to as an eye dominance degree.

According to an embodiment, the electronic device may store in a memory (e.g., the memory 130 of FIG. 1) information on the user's dominant eye and an eye dominance degree determined when performing a dominant eye determination operation.

According to an embodiment, when users with different dominant eyes point their fingers at objects at substantially the same location, or when users with the same dominant eye and different eye dominance degrees point their fingers at objects at substantially the same location, the positions of the fingers of the users may be nonetheless different. Accordingly, the electronic device according to an embodiment may determine a user's dominant eye and correct a position indicated by the user based on the determined dominant eye and the eye dominance degree to accurately select an object the user wants to select. Hereinafter, a user's finger may be referred to as a first object.

According to an embodiment, in a dominant eye determination operation (operation 301), the electronic device may display a first reference point on augmented reality content and identify a position of a first object pointing to a first reference point in a state where the first reference point is displayed. According to an embodiment, in the dominant eye determination operation (operation 301), the electronic device may display a guide instructing the user to point to the first reference point through the display module 160. According to an embodiment, a position of the first object identified by the electronic device using a camera module (e.g., the camera module 180 of FIG. 2) when the user points to the first reference point may be referred to as the first position. According to an embodiment, the electronic device may identify the first position of the first object during the dominant eye determination operation (operation 301).

According to an embodiment, the first reference point may be a point arbitrarily displayed on the augmented reality content by the electronic device to determine the dominant eye of the user in the dominant eye determination operation (operation 301) by the electronic device. The first reference point may be, for example, a virtual point or a menu of a home screen of the augmented reality content, but is not limited thereto.

According to an embodiment, the electronic device may display augmented reality content through a display by executing an AR application. A surrounding space may be scanned through a camera module and a sensor module of the electronic device. Based on the data obtained by the camera module 180 and the sensor module 176, the electronic device may scan an area around the electronic device and then generate a 3D (three dimensional) spatial coordinate system. The augmented reality content may include a 3D spatial coordinate system. The electronic device may arrange and/or display a real object or a virtual object in the created 3D spatial coordinate system. According to an embodiment, a real object or a virtual object may be a 3D object arranged in the 3D spatial coordinate system.

According to an embodiment, the electronic device may identify a position of the user's fingertip (e.g., the tip of a fingernail) as the position of the first object (e.g., the first position). According to an embodiment, the electronic device may identify the position of the first object using the center of the head mounted display as a reference point.

According to an embodiment, the electronic device may store the identified first location of the first object in association with the first reference point in a memory. A more detailed description of the dominant eye determination operation of the electronic device will be described later with reference to FIGS. 5, 6A, and 6B.

According to an embodiment, as the user's dominant eye determination operation (operation 301) ends, the electronic device may display a notification notifying that the dominant eye determination has ended on augmented reality content and display a guide instructing a user to point to an object, which the user wants to select on augmented reality content, on the augmented reality content.

In operation 303, the electronic device may identify a second position of the first object. For example, the user may move the first object (e.g. the finger of the user) to point at a second object which the user wishes to select. For example, the second object may be a real object or a virtual object. According to an embodiment, after the dominant eye determination operation (operation 301) has been ended, the electronic device may identify the position of the first object pointing to the second object for the user to select the second object on the augmented reality content. According to an embodiment, when the user points to the second object on the augmented reality content, a position of the first object identified by the electronic device using the camera module may be referred to as a second position.

In operation 305, the electronic device may determine a first correction value based on dominant eye correction information stored in the memory. According to an embodiment, the dominant eye correction information may be a value stored in the memory by the electronic device in the form of a table as a correction value which varies according to the dominant eye and the eye dominance degree. However, a form in which the correction value that varies according to the dominant eye and the eye dominance degree is stored in the memory is not limited thereto. As one alternative example, the dominant eye correction information may be a value stored in the memory by the electronic device in the form of a linked list storing correction values that are different according to the dominant eye and the eye dominance degree. The table or linked list may be information in which different correction values are mapped according to the dominant eye and the eye dominance degree. For example, the more dominant the dominant eye, the larger the correction value may be mapped.

According to an embodiment, the electronic device may determine a first correction value corresponding to the dominant eye and the eye dominance degree of the user of the electronic device determined in the dominant eye determination operation (operation 301) based on the dominant eye correction information. For example, the electronic device may determine, as the first correction value, a correction value corresponding to the dominant eye and the eye dominance degree of the user of the electronic device determined in the dominant eye determination operation (operation 301) from the table or the linked list. According to an embodiment, the electronic device may store the determined first correction value in a memory.

According to an embodiment, the electronic device may determine the first correction value further based on a distance from the first position to the second position of the first object. According to an embodiment, the electronic device may store, in a memory, a correction value that varies according to a distance to the identified position of the first object when the user points to the second object to select the second object on the augmented reality content (e.g., a second position) with respect to the position of the first object identified during the dominant eye determination operation (e.g., a first position). For example, as the distance from the position of the first object identified during the dominant eye determination operation (e.g., the first position) to the position of the first object identified when the second object is selected (e.g., the second position) increases, the correction value may be a larger value.

According to an embodiment, the electronic device may determine, as a first object correction value, a correction value corresponding to a distance from the first position to the second position of the first object among correction values stored in the memory, based on the first position of the first object identified in operation 301 and the second position of the first object identified in operation 303. According to an embodiment, the electronic device may determine a correction value corresponding to the dominant eye, the eye dominance degree, and the distance from the first position to the second position of the first object as the first correction value. For example, the electronic device may determine, as the first correction value, a value obtained by adding or subtracting a value specified according to the distance from the first position to the second position, which is in turn based on the correction value determined according to the dominant eye and the eye dominance degree, but the determination process is not limited thereto. According to an embodiment, the electronic device may store the determined first correction value in a memory.

In operation 307, the electronic device may recognize a point moved by the first correction value from a first reference point as a selected point: e.g., a point selected by a user of the device. According to an embodiment, the electronic device may recognize a point moved by the first correction value from the first reference point based on the position of the first reference point and the first correction value stored in the memory, and the recognized point may be referred to as the selected point herein.

According to an embodiment, the electronic device may recognize, as the selected point, a point moved by the first correction value from the first reference point based on the moving direction of the first object. The moving direction of the first object may refer to a direction from the position of the first object identified by the electronic device as pointing to the first reference point during the dominant eye determination operation toward the position of the first object identified as pointing to a certain object (e.g., a second object) on augmented reality content. For example, the electronic device may recognize, as the selected point, a point moved from the first reference point by the first correction value based on a direction from the first position to the second position. For example, as the first object approaches or moves away from the user, the moving direction of the first object or the direction from the first position to the second position may include a distance direction from the user.

In operation 309, the electronic device may select a second object corresponding to the selected point. According to an embodiment, the electronic device may select a second object displayed at a position corresponding to the selected point on augmented reality content. The second object may be, for example, a real object existing in real space and recognized by the camera module of the electronic device. As another example, the second object may be a virtual object created to be displayed at a position corresponding to the selected point.

Although the case of selecting the second object displayed at the position corresponding to the selected point was used as an example in the above-described embodiment, when there is no second object accurately displayed at the position corresponding to the selected point, electronic device may select a second object displayed at the closest position, out of the positions of all selectable objects, to the position corresponding to the selected point. According to various embodiments, the electronic device may further consider the depth of the second object on the augmented reality content during the first correction value determination operation (operation 303). The depth of the second object on the augmented reality content may refer to, for example, a distance from the center of the head-mounted display of the electronic device to the second object on the augmented reality content.

According to an embodiment, when the second object on the augmented reality content is a real object, the electronic device may identify a depth of the second object on the augmented reality content using a camera module (e.g., the depth camera 215 of FIG. 2). According to an embodiment, the electronic device may identify a depth of the second object, which is a real object existing in a direction which the first object points to, using the camera module. For example, the electronic device may recognize a direction from the center of the head-mounted display to the position of the first object as a direction which the first object points to.

According to an embodiment, when the second object on the augmented reality content is a virtual object, the electronic device may have stored the depth of the second object on the augmented reality content in the memory. According to an embodiment, the electronic device may identify a depth of the second object, which is a virtual object displayed in the direction which the first object points to, based on information stored in the memory.

According to an embodiment, the electronic device may store a correction value that varies according to the depth of the second object on the augmented reality content in the memory. According to an embodiment, in operation 305, the electronic device may determine a first correction value further based on the identified depth of the second object on the augmented reality content. The electronic device according to an embodiment may more accurately recognize a position which the user points to further based on the depth of the second object when determining the first correction value, thus improving accuracy of object selection.

According to another embodiment, the electronic device may identify the depth of the second object on the augmented reality content based on the size of the user's pupil. According to an embodiment, in operation 305, the electronic device may determine the first correction value further based on a distance value determined based on the size of the user's pupil. The present embodiment will be described in detail with reference to FIGS. 7 and 8 below.

For example, the electronic device may detect a size of the user's pupil using a camera module (e.g., the eye tracking camera 213 of FIG. 2) that captures the user's eyeballs (or pupils), and determine a distance value based on the detected size of the user's pupil.

According to various embodiments, the electronic device may determine the first correction value further based on a distance value determined based on the size of the user's pupil. According to an embodiment, the electronic device may detect a change in size of the user's pupil using the camera module, and determine a distance value based on the detected change in size of the user's pupil. A method of determining a distance value based on the change in the size of the user's pupil in the electronic device will be described later in detail with reference to FIGS. 7 and 8.

Hereinafter, operations of the electronic device shown in FIG. 3 will be described using examples with reference to FIG. 4.

Figure 4:
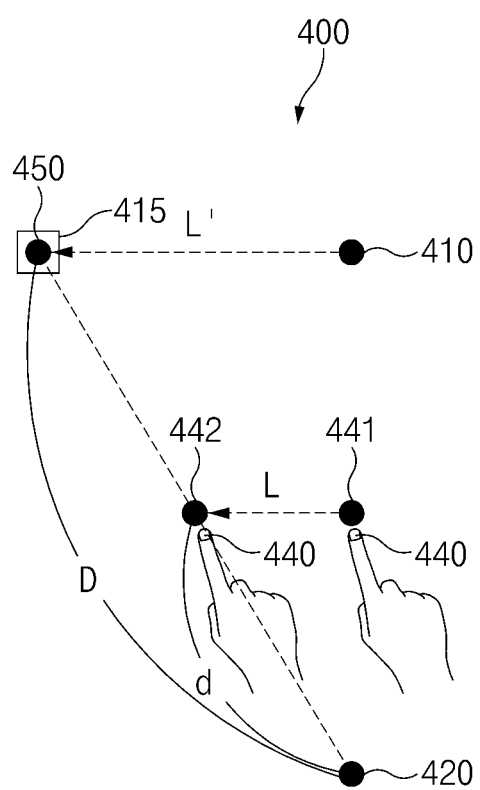
FIG. 4 is a diagram illustrating an example execution of a dominant eye correction operation of an electronic device according to an embodiment.

FIG. 4 is a diagram 400 illustrating an example execution of a dominant eye correction operation of an electronic device according to an embodiment. The operations of the electronic device to be described below may be performed by the electronic device 201 of FIG. 2, or by the processor 120 of the electronic device 201.

According to an embodiment, the electronic device may display a first reference point 410 on augmented reality content provided through the display module 160 during a dominant eye determination operation (e.g., operation 301 of FIG. 3). The first reference point may be, for example, a virtual point displayed on the augmented reality content by the electronic device to determine a dominant eye.

According to an embodiment, before displaying the first reference point 410, the electronic device may display a notification notifying a user that the first reference point 410 is a virtual point displayed for determining the dominant eye and, after the first reference point 410 is displayed, provide a guide instructing the user to point to the first reference point 410. The guide may be text, an image, or voice, for example.

According to an embodiment, the electronic device may identify a first position 441 of a first object 440 (e.g., a user's finger) pointing to the first reference point 410 using a camera module (e.g., the camera module 180 of FIG. 2). As described above, the electronic device may identify the position of the first object 440 based on the user's fingertip (e.g., the tip of a fingernail). As described above, the first position 441 may be the position of the user's fingertip (e.g., the tip of a fingernail) pointing to the first reference point 410.

According to an embodiment, the electronic device may identify the position of the first object 440 based on a second reference point 420. For example, the second reference point 420 may be the center of a head mounted display.

According to an embodiment, the electronic device may determine a dominant eye and an eye dominance degree based on the first position 441 of the first object 440 pointing to the first reference point 410. A method for determining a dominant eye and an eye dominance degree in the electronic device will be described later in detail with reference to FIG. 5.

According to an embodiment, the electronic device may determine a first correction value L' corresponding to the determined dominant eye and the determined eye dominance degree based on dominant eye correction information stored in a memory (e.g., the memory 130 of FIG. 2). Because the dominant eye correction information and the method for determining the first correction value in the electronic device have been described above with reference to FIG. 3, duplicate descriptions will be simplified or omitted.

According to an embodiment, when the dominant eye determination operation has ended, the electronic device may provide a guide for instructing a user to point to an object (e.g., a second object 415) that the user wants to select from among at least one object on the augmented reality content. According to an embodiment, when the dominant eye determination operation has ended in the electronic device, the user may move the first object 440 to point to an object to be selected (e.g., the second object 415). According to an embodiment, the electronic device may identify a second position 442 using the camera module according to the movement of the first object 440 by the user after the dominant eye determination operation.

According to an embodiment, as the electronic device identifies the second position 442, the electronic device may determine the first correction value L' further based on a distance L from the first position 441 to the second position 442. Because such a method for determining the first correction value L' has been described above with reference to FIG. 3, duplicate descriptions will be omitted or simplified. The electronic device may store the first correction value L' in a memory.

According to an embodiment, the electronic device may recognize a selected point 450 moved from the first reference point 410 by the first correction value L'. According to an embodiment, the electronic device may recognize a selected point 450 moved from the first reference point 410 by the first correction value L' based on a direction from the first position 441 to the second position 442. Referring to FIG. 4, the electronic device may recognize the selected point 450 moved from the first reference point 410 to the left by the first correction value L', for example, by identifying that the first object has moved by a distance L in the left direction.

According to an embodiment, the electronic device may select the second object 415 on augmented reality content corresponding to the selected point 450. According to an embodiment, the second object 415 may be an object displayed at a position corresponding to the selected point 450, or may be an object displayed at a position closest, out of the positions of all selectable objects, to the position corresponding to the selected point 450. The second object 415 may be, for example, a real object recognized by the electronic device using the camera module, or may be a virtual object created by the electronic device and displayed on augmented reality content provided through the display module 160.

As described above, according to an embodiment, the electronic device may determine the first correction value L' further based on the depth of the second object 415 on the augmented reality content. The depth of the second object 415 on the augmented reality content may be, for example, a distance D from the second reference point 420 to the second object 415. According to an embodiment, the electronic device may determine the first correction value L' based on the distance D from the second reference point 420 to the second object 415 on the augmented reality content.

For example, the electronic device may identify the distance D to the second object 415 on the augmented reality content using the camera module when the second object 415 on the augmented reality content is a real object, and identify the distance D to the second object 415 based on information stored in the memory when the second object 415 is a virtual object. As another example, the electronic device may identify the distance D to the second object 415 according to the size of a pupil detected by a camera module (e.g., the eye tracking camera 213 of FIG. 2) configured to capture the user's eyeballs, which will be described later with reference to FIG. 7.

According to an embodiment, the electronic device may identify the depth of the second object 415 on the augmented reality content existing in a direction which the first object 440 points to. The electronic device may identify the direction which the first object 440 points to, based on the position of the first object 440 when the user selects an object. For example, the electronic device may recognize a direction from the second reference point 420 to the second position 442 of the first object 440 as a direction which the first object 440 points to. According to an embodiment, the electronic device may identify a distance D from the second reference point 420 to the second object 415 on the augmented reality content existing in the direction in which the first object 440 points to.

According to an embodiment, the electronic device may store information on correction values according to depths of an object on the augmented reality content in the form of a table in the memory 130, select a correction value corresponding to the distance D to the identified second object 415 on the augmented reality content, and determine the corresponding correction value as the first correction value L'. However, a form in which information on correction values according to depths of an object on augmented reality content is stored in a memory is not limited thereto. According to various embodiments, the electronic device may determine the first correction value L' based further on the depth of the first object 440. The depth of the first object 440 may refer to the distance d from the second reference point 420 to the first object 440, which the electronic device identifies using the camera module when the user selects the second object 415. According to an embodiment, the depth of the first object 440 when the user points to the second object 415 may vary according to the depth of the second object 415 on the augmented reality content, which the first object 440 points to. For example, the depth of the first object 440 when the user points to the second object 415 may increase as the depth of the second object 415 on the augmented reality content, which the first object 440 points to, is deeper. Therefore, when the distance D from the second reference point 420 to the second object 415 on the augmented reality content existing in the direction which the first object 440 points to increases, a distance d from the second reference point 420 to the first object 440 identified using the camera module may also be larger. Based on the depth of the first object 440 when the user points to the second object 415 on the augmented reality content, the electronic device may identify the depth of the second object 415 on the augmented reality content which the first object 440 points to, and determine the first correction value L' based on the identified depth of the second object 415 on the augmented reality content.

In the above-described embodiment, the electronic device may store information on the depth of the first object 440, which varies according to the depth of an object on the augmented reality content, which the first object 440 points to, in the form of a table in the memory 130. However, a form in which information on the depth of the first object 440, which varies according to the depth of the object on the augmented reality content, which the first object 440 points to, is stored in the memory is not limited thereto. The information on the depth of the first object 440, which varies according to the depth of the second object 415 on the augmented reality content which the first object 440 points to, may be information obtained when the electronic device performs the dominant eye determination operation (operation 301 of FIG. 3). A method for obtaining the information on the depth when the electronic device performs the dominant eye determination operation will be described later in detail with reference to FIGS. 5, 6A, and 6B.

Hereinafter, an operation of determining a dominant eye in an electronic device according to an embodiment will be described with reference to FIG. 5. According to an embodiment, the operations illustrated in FIG. 5 may be sub-operations of operation 301 of FIG. 3.

Figure 5:
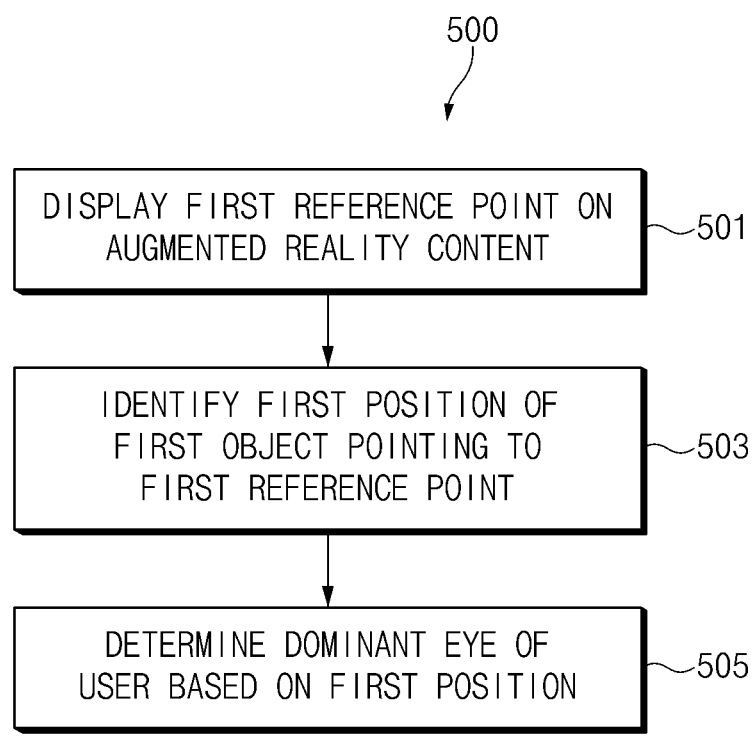
FIG. 5 is a flowchart illustrating a dominant eye determination operation of an electronic device according to an embodiment.

FIG. 5 is a flowchart 500 illustrating a dominant eye determination operation of an electronic device according to an embodiment. The operations of the electronic device to be described below may be performed by the electronic device 201 of FIG. 2, or the processor 120 of the electronic device 201.

In operation 501, the electronic device may display a first reference point (e.g., the first reference point 410 of FIG. 4) on the augmented reality content displayed on a display (e.g., the display module 160 of FIG. 2). The first reference point may be, for example, a virtual point or a menu of a home screen of the augmented reality content, but is not limited thereto.

According to an embodiment, the electronic device may perform an operation of displaying the first reference point to determine a dominant eye (operation 501) in response to identifying that the power supply of the electronic device is switched from an off state to an on state. The electronic device may display a notification notifying the user that the dominant eye determination operation is being performed, and may display a guide for performing the dominant eye determination operation on the augmented reality content, before performing the operation of displaying the first reference point to determine a dominant eye (operation 501) or while substantially simultaneously performing the operation. The electronic device may display, for example, text that reads "Dominant eye determination operation is being performed. Please, point to the dot you see on the screen" through the display module 160 and reproduce a voice through a sound output module (e.g., the sound output module 155 of FIG. 1). The user may point to the first reference point using the first object according to the notification and guide. According to an embodiment, the first object may be a part of the user's body, for example, the user's finger. Hereinafter, it is assumed that the first object is a user's finger.

In operation 503, the electronic device may identify a first position of the first object pointing to the first reference point. According to an embodiment, the electronic device may identify the position of the first object using a camera module (e.g., the camera module 180 of FIG. 2). According to an embodiment, the electronic device may identify the position of the first object with respect to the user's fingertip (e.g., fingernail tip). According to an embodiment, the position of the first object pointing to the first reference point may be referred to as a first position.

According to an embodiment, the electronic device may store the first position of the first object pointing to the first reference point in association with the position of the first reference point in a memory (e.g., the memory 130 of FIG. 2).

In operation 505, the electronic device may determine the user's dominant eye based on the first position. For example, the electronic device may determine that the user's dominant eye is the right eye when the first position belongs to an area specified to determine that the right eye is the dominant eye. In addition, the electronic device may determine that the user's dominant eye is the left eye when the first position belongs to an area specified to determine that the left eye is the dominant eye.

According to an embodiment, the electronic device may determine the eye dominance degree based on the first position. For example, when the first position belongs to the right area of an area specified to determine that the right eye is the dominant eye, the electronic device may determine that a dominant eye is relatively more dominant than a case where the first position belongs to the left area of the area specified to determine that the right eye is the dominant eye. In addition, when the first position belongs to the left area of an area specified to determine that the left eye is the dominant eye, the electronic device may determine that a dominant eye is relatively more dominant than a case where the first position belongs to the right area of the area specified to determine that the left eye is the dominant eye.

According to various embodiments, the electronic device may display a plurality of first reference points on augmented reality content with different depths, identify the depths of the first object respectively pointing to the plurality of first reference points using a camera module, and obtain information on the depth of the first object according to the depth of an object on the augmented reality content, which the first object points to, based on the depths of the first object respectively pointing to the plurality of first reference points. The electronic device may store information on the depth in the memory.

According to the above-described embodiment, the electronic device may display the plurality of first reference points on the augmented reality content with different depths. In this case, the depth may refer to a distance from the electronic device or a user of the electronic device to an object on the augmented reality content, for example, a distance from a second reference point (e.g., the second reference point 420 of FIG. 4) to an object on the augmented reality content. The second reference point may be, for example, the center of a head mounted display of the electronic device. According to an embodiment, the electronic device may display a plurality of first reference points having different distances from the second reference point on the augmented reality content. According to an embodiment, the electronic device may identify the depth of the first object pointing to each of the plurality of first reference points. According to an embodiment, the electronic device may identify the depth of the first object using the camera module. According to an embodiment, the electronic device may identify a distance from the second reference point to the first object pointing to each of the plurality of first reference points by using a camera module.

According to an embodiment, the electronic device may obtain information on the depth of the first object according to the depth of the second object (e.g., the second object 415 of FIG. 4) on the augmented reality content, which the first object points to, based on the depth of the first object pointing to each of the plurality of first reference points. The electronic device may store the obtained information on the depth in the memory.

According to an embodiment, the electronic device may determine the depth of the second object 415 (e.g., D of FIG. 4) on the augmented reality content based on the depth of the first object (e.g., d of FIG. 4) when the user selects the second object (e.g., the second object 415 of FIG. 4) based on the information on the depth stored in the memory and determine a correction value (e.g., L' of FIG. 4) based on the depth of the second object 415 (e.g., D of FIG. 4) on the augmented reality content. Because the method of determining the correction value based on the information on the depth in the electronic device has been described above with reference to FIG. 4, a detailed description thereof will be simplified or omitted.

An electronic device according to various embodiments may perform operations 303 to 309 of FIG. 3 after performing the dominant eye determination operation described above.

Hereinafter, the dominant eye determination operation of the electronic device shown in FIG. 5 will be described with reference to FIGS. 6A and 6B.

Figure 6A:
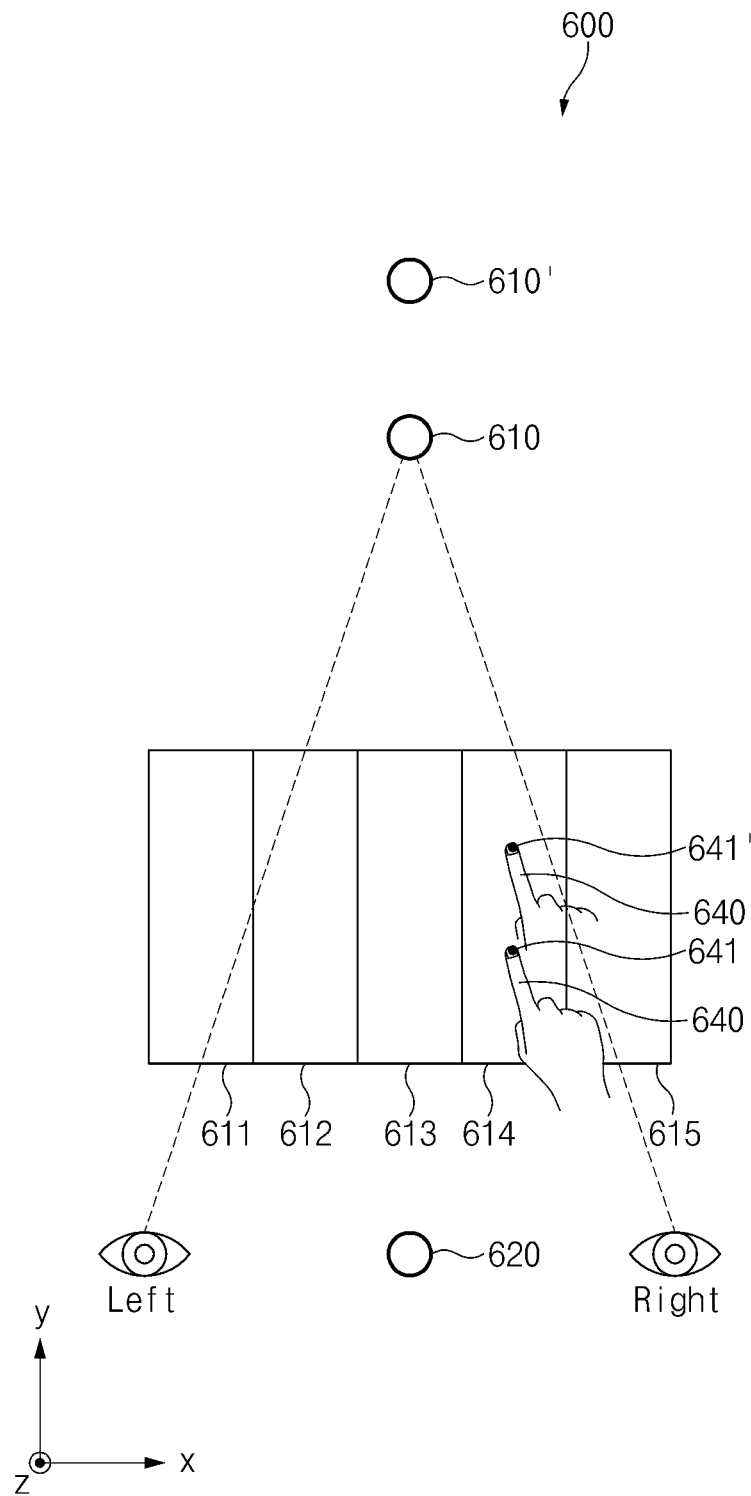
FIGS. 6A and 6B are diagrams illustrating an example execution of a dominant eye determination operation of an electronic device according to an embodiment.
Figure 6B:
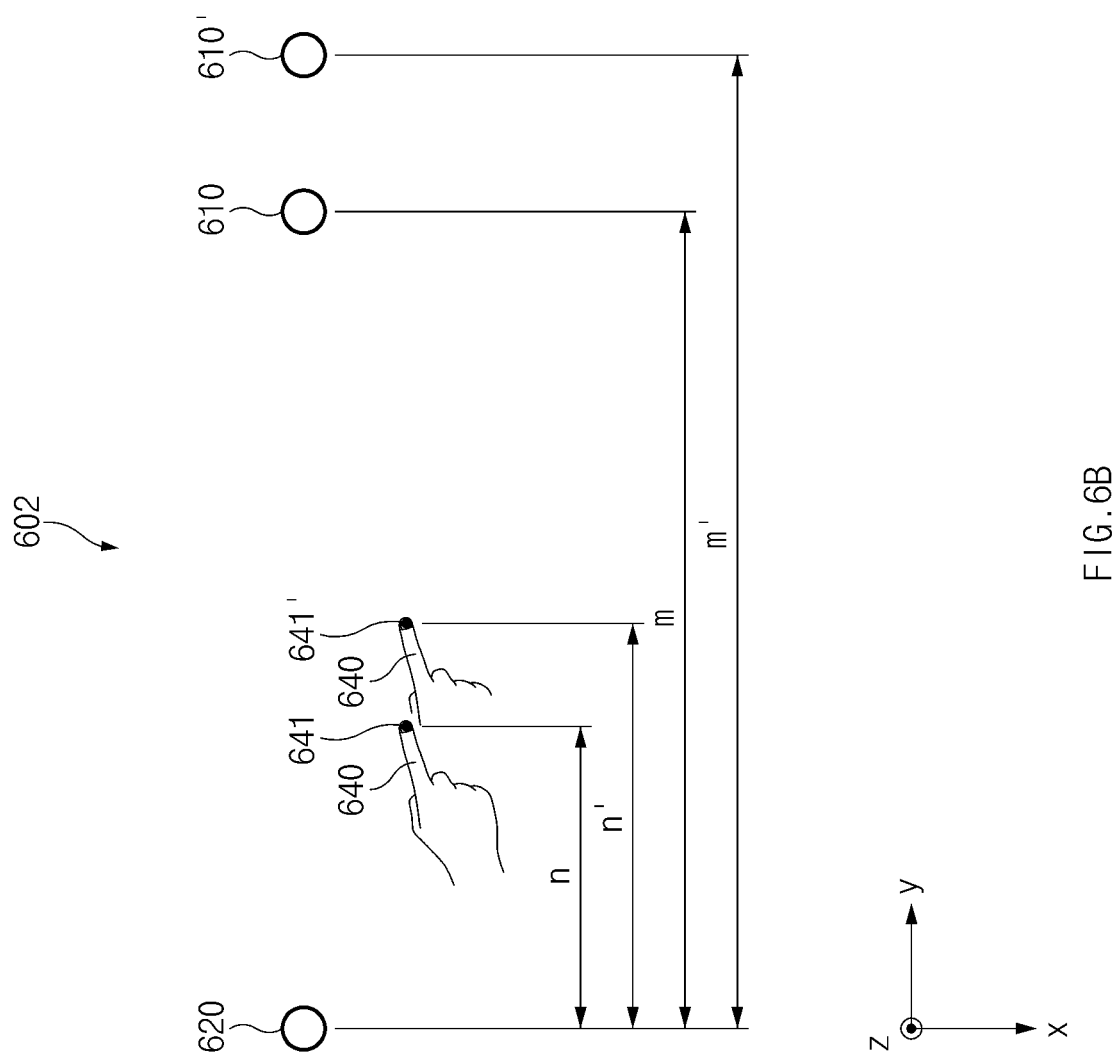

FIGS. 6A and 6B are diagrams 600 and 602 illustrating an example execution of a dominant eye determination operation of an electronic device according to an embodiment. The operations of the electronic device to be described below may be performed by the electronic device 201 of FIG. 2, or by the processor 120 of the electronic device 201.

According to an embodiment, the electronic device may display a first reference point 610 on augmented reality content. According to an embodiment, the electronic device may display the first reference point 610 on the augmented reality content when initially displaying the augmented reality content on the display module 160.

Referring to FIGS. 6A and 6B, the first reference point 610 may be, for example, a virtual point, but is not limited thereto. As another example, the first reference point 610 may be a menu of a home screen of augmented reality content.

Although not shown in FIGS. 6A and 6B, the electronic device according to an embodiment may display a user interface (UI) including a text instructing the user to point to the first reference point 610 on the augmented reality content. Accordingly, the user may make a gesture pointing to the first reference point 610. Referring to FIGS. 6A and 6B, for example, the user may point to the first reference point 610 using a finger. Hereinafter, the user's finger is referred to as a first object 640.

According to an embodiment, the electronic device may identify a first position 641 of the first object 640 pointing to the first reference point 610 using the camera module 180. According to an embodiment, the electronic device may identify the position of the first object 640 based on the tip of the finger (e.g., the tip of the fingernail).

According to an embodiment, the electronic device may determine the user's dominant eye based on the first position 641 of the first object 640. For example, the electronic device may determine which area of a first area 611, a second area 612, a third area 613, a fourth area 614, and/or a fifth area 615 the first position 641 of the first object 640 belongs to. For example, the electronic device may determine that the left eye is a dominant eye when the first position 641 of the first object 640 is identified as belonging to the first area 611 or the second area 612, and determine that the right eye is a dominant eye when the first position 641 of the first object 640 is identified as belonging to the fourth area 614 or the fifth area 615. The electronic device may determine that the right eye and the left eye are or are not both dominant eyes when the first position 641 of the first object 640 is identified as belonging to the third area 613.

According to an embodiment, the electronic device may determine an eye dominance degree of the user based on the first position 641 of the first object 640. For example, when the first position 641 of the first object 640 is identified as belonging to the fifth area 615, the electronic device may determine that the dominant eye (right eye) is more dominant than a case where the first position 641 of the first object 640 is identified as belonging to the fourth area 614.

In the above-described embodiment, the case of determining the dominant eye and the non-dominant eye by dividing an area into five areas in identifying the first position 641 of the first object 640 has been exemplified, but the disclosure is not limited to the number or size (e.g., area or width) of the areas shown in FIG. 6A.

According to various embodiments, the electronic device may display a plurality of first reference points 610 and 610' on the augmented reality content with different depths. For example, the plurality of first reference points 610 and 610' may be virtual points on augmented reality content having different depths. Here, the depth may mean a distance from a second reference point 620 of the electronic device to an object (the first reference point 610 or 610' or the first object 640) on the augmented reality content. For example, the second reference point 620 of the electronic device may be the center of the head mounted display of the electronic device. According to an embodiment, the electronic device may display the first reference point 610 and the first reference point 610' having different distances from the second reference point 620 on augmented reality content.

According to an embodiment, the electronic device may identify the first positions 641 and 641' of the first object 640 respectively pointing to the plurality of first reference points 610 and 610' using a camera module (e.g., the camera module 180 of FIG. 2). According to an embodiment, the electronic device may identify the depth of the first object 640 based on the first position 641 or 641' of the first object 640 pointing to the first reference point 610 or 610' using the camera module.

Referring to FIG. 6B, the electronic device may identify the distance n from the second reference point 620 to the first object 640 pointing to the first reference point 610 as the depth of the first object 640 pointing to the first reference point 610 and identify the distance n' from the second reference point 620 to the first object 640 pointing to the first reference point 610' as the depth of the first object 640 pointing to the first reference point 610'. In this case, the depth of the first reference point 610 displayed on the augmented reality content by the electronic device is a distance m from the second reference point 620 to the first reference point 610, and the depth of the first reference point 610' is a distance m' from the second reference point 620 to the first reference point 610', so that the depth of the first reference point 610 and the depth of the first reference point 610' may be different from each other.

According to an embodiment, the electronic device may store the depth n or n' of the first object 640 in respective association with the depth m or m' of the first reference point 610 or 610' which the first object 640 is pointing to, in the memory. For example, the electronic device may store, in the memory, the depth n or n' of the first object 640 pointing to the first reference point 610 or 610', which varies according to the depth m or m' of the first reference point 610 or 610', in the form of a table and/or a linked list.

According to an embodiment, the electronic device may obtain information on the depth of the first object pointing to the second object 415 on the augmented reality content, which varies according to the depth of the second object (e.g., the second object 415 of FIG. 4) on the augmented reality content based on the depth n or n' of the first object 640 pointing to the first reference point 610 or 610', which varies according to the depth m or m' of the first reference point 610 or 610'. The electronic device may store the obtained information on the depth in a memory.

According to the above-described embodiment, when the dominant eye determination operation is performed, the electronic device may track a change in depth of the first object, which varies according to the depth of the first reference point and determine the depth of the second object 415 on the augmented reality content the first object points to, based on the depth of the first object when the user selects an object. The electronic device may determine a first correction value according to the determined depth of the second object 415 and perform correction using the first correction value, thus determining which object the user selects among objects having only different depths and improving the accuracy of object selection.

Hereinafter, supplemental operations of the electronic device 201 according to the embodiment shown in FIG. 2 will be described with reference to FIG. 7.

Figure 7:
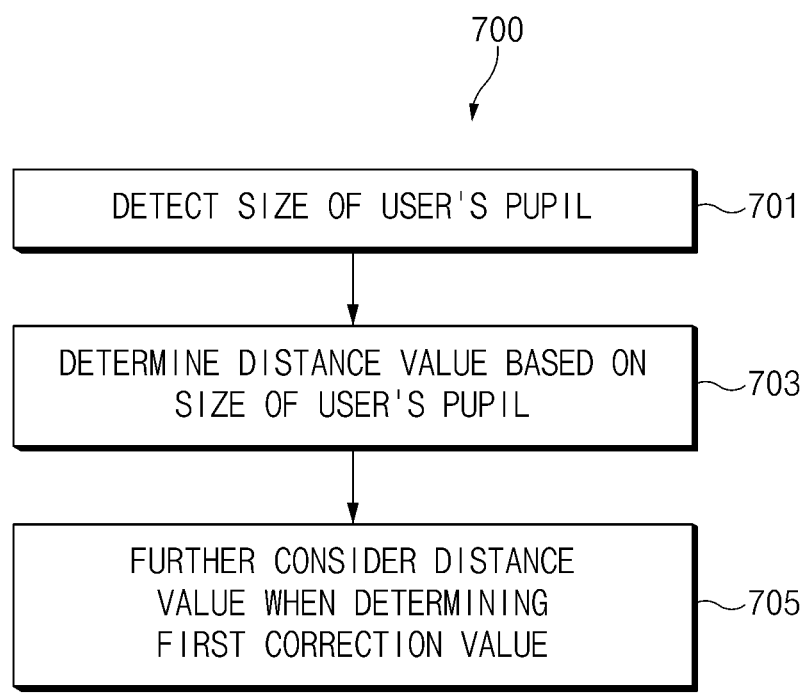
FIG. 7 is a flowchart illustrating supplemental operations for correction value determination by an electronic device according to an embodiment.

FIG. 7 is a flowchart 700 illustrating supplemental operations for correction value determination by an electronic device, based on a size of a user's pupil, according to an embodiment. The operations of the electronic device to be described below may be performed by the electronic device 201 of FIG. 2, or by the processor 120 of the electronic device 201. When performing operation 305 of FIG. 3, the electronic device may further perform the process (operations 701 to 705) of FIG. 7.

In operation 701, the electronic device may detect a size of a pupil of a user of the electronic device by using a camera module (e.g., the eye tracking camera 213 of FIG. 2). As described above, because the camera module is arranged toward the eyes of the user of the electronic device, the camera module may capture the user's eyes.

In operation 703, the electronic device may identify a distance from a second reference point (e.g., the second reference point 420 in FIG. 4 or the second reference point 620 in FIGS. 6A and 6B) to a second object (e.g., the second object 415 of FIG. 4) on the augmented reality content, which the user looks at, based on the size of the user's pupil. According to an embodiment, the second reference point may be the center (e.g., 420 of FIG. 4 or 620 of FIGS. 6A and 6B) of a head-mounted display of the electronic device. According to an embodiment, the electronic device may identify a distance from the center of the head-mounted display of the electronic device to the second object on the augmented reality content which the user looks at, based on the size of the user's pupil. As described above, the second object on the augmented reality content which the user looks at may be an object on the augmented reality content which the user points to, or may be an object on the augmented reality content which the first object (user's finger) points to.

According to an embodiment, the electronic device may identify that the second object which the user is looking at is further away as the size of the user's pupil is smaller. That is, the electronic device may identify that the distance from the second reference point to the second object on the augmented reality content is longer as the size of the user's pupil is smaller. Conversely, the electronic device may identify that the second object the user is looking at is closer as the size of the user's pupil is larger. That is, the electronic device may identify that the distance from the second reference point to the second object on the augmented reality content is shorter as the size of the user's pupil is larger. According to an embodiment, the size of the user's pupil detected by the electronic device using the second camera module may be inversely proportional to the distance from the second reference point to the second object on the augmented reality content which the first object points to.

In operation 705, the electronic device may determine a first correction value based further on a distance from the second reference point to the second object (e.g., the second object 415 of FIG. 4) on the augmented reality content which the first object points to. The distance from the second reference point to the second object on the augmented reality content which the first object points to may be differently referred to as a depth of the second object on the augmented reality content in various embodiments of the disclosure. A description overlapping with the description referring to FIG. 4 in relation to the operation of adjusting the first correction value in the electronic device will be omitted or simplified.

According to the foregoing description with reference to FIG. 4, for example, the electronic device may determine, as the first correction value (e.g., L' of FIG. 4), a larger value as the distance (e.g., D in FIG. 4) from the second reference point (e.g., second reference point 420 in FIG. 4) to the second object (e.g., second object 415 in FIG. 4) on the augmented reality content is longer. In addition, the electronic device may determine, as the first correction value, a smaller value as the distance from the second reference point to the second object 415 on the augmented reality content is shorter. As described above, the electronic device may store information on a correction value that varies according to the depth of the second object 415 on the augmented reality content in the form of a table in a memory (e.g., the memory 130 of FIG. 2). The electronic device may determine the depth of the second object 415 on the augmented reality content based on the detected size of the user's pupil using the camera module, and determine, as a first correction value, a correction value corresponding to the determined depth of the second object 415 on the determined augmented reality content in the table.

According to various embodiments, the electronic device may determine the depth of a second object (e.g., the second object 415 of FIG. 4) on the augmented reality content based on the size of the user's pupil detected using the camera module and adjust a predetermined first correction value based on the determined depth of the second object on the augmented reality content. In this case, the first correction value may be a correction value determined based on information on the user's dominant eye and eye dominance degree and the position of the first object as the electronic device performs operations 301 to 305 of FIG. 3.

Hereinafter, further supplemental operations of the electronic device 201 according to the embodiment shown in FIG. 2 will be described with reference to FIG. 8.

Figure 8:
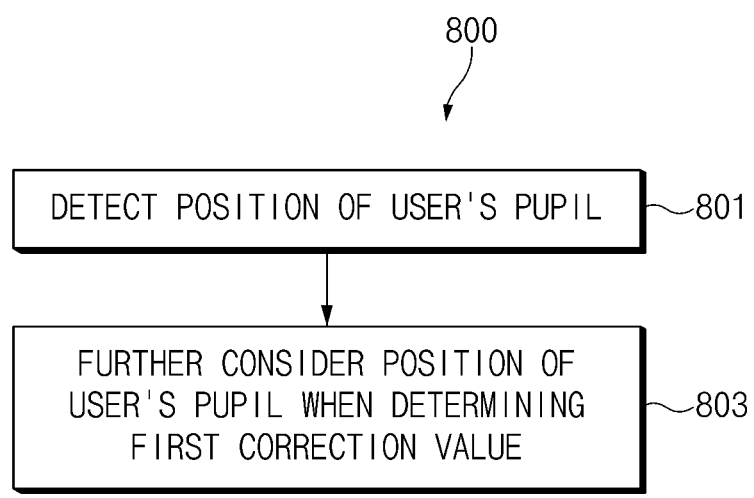
FIG. 8 is a flowchart illustrating further supplemental operations for correction value determination by an electronic device according to an embodiment.

FIG. 8 is a flowchart 800 illustrating further supplemental operations for correction value determination by an electronic device, based on a position of a user's pupil, according to an embodiment. The operations of the electronic device to be described below may be performed by the electronic device 201 of FIG. 2, or by the processor 120 of the electronic device 201. When performing operation 305 of FIG. 3, the electronic device may further perform the process (operations 801 to 803) of FIG. 8.

In operation 801, the electronic device may detect a position of the pupil of the user of the electronic device by using a camera module (e.g., the eye tracking camera 213 of FIG. 2). As described above, because the camera module is arranged toward the eyes of the user of the electronic device, the camera module may capture the user's eyes. For example, the electronic device may detect a position to which the user's pupil has moved left or right with respect to the center of the eye.

In operation 803, the electronic device may determine a first correction value based further on the position of the user's pupil. According to an embodiment, the electronic device may adjust the predetermined first correction value based further on the position of the user's pupil detected using the camera module. In this case, the first correction value may be a correction value determined based on information on the user's dominant eye and eye dominance degree and the position of the first object as the electronic device performs operations 301 to 305 of FIG. 3. According to an embodiment, the electronic device may adjust the first correction value determined based on the user's dominant eye, the eye dominance degree, and the position of the first object as the electronic device detects that the user's pupil has moved left or right with respect to the center of the eye.

The electronic device according to the above-described embodiment may recognize the position of the second object (e.g., the second object 415 of FIG. 4) on the augmented reality content more accurately by determining the first correction value based further on the position of the user's pupil.

Hereinafter, an expanded method for operating an electronic device (e.g., the electronic device 201 of FIG. 2) according to an embodiment will be described with reference to FIG. 9.

Figure 9:
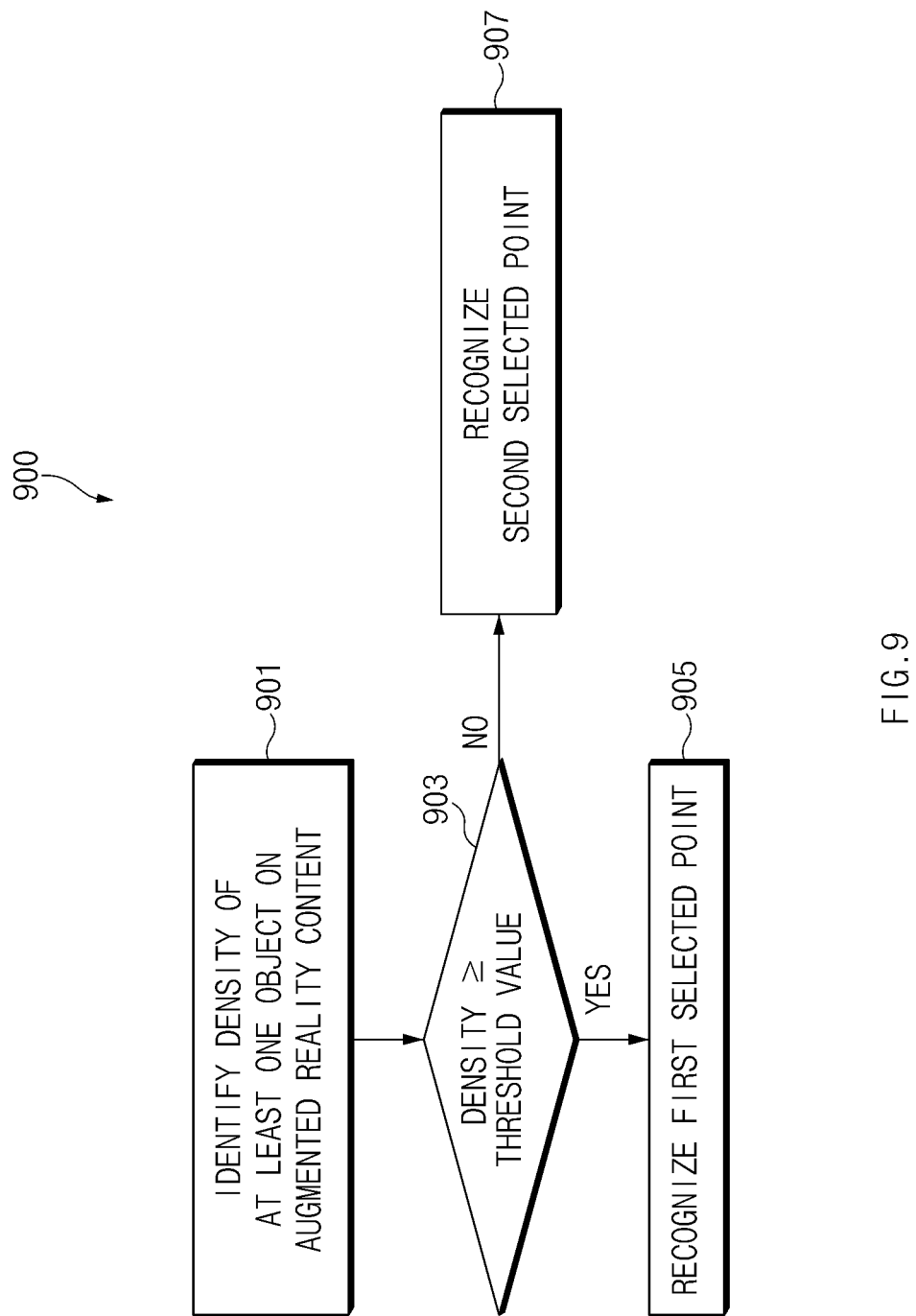
FIG. 9 is a flowchart illustrating an expanded method for operating an electronic device according to an embodiment.

FIG. 9 is a flowchart 900 illustrating an expanded method for operating an electronic device according to an embodiment. The operations of the electronic device to be described below may be performed by the electronic device 201 of FIG. 2, or by the processor 120 of the electronic device 201.

In operation 901, the electronic device may identify a density of at least one object on augmented reality content.

According to one embodiment, augmented reality content may include at least one object. For example, the at least one object related to the density calculation may include at least one of: a real object recognized by a camera module (e.g., the camera module 180 of FIG. 2) of the electronic device, or a virtual object created by the electronic device. According to an embodiment, a part of the user's body (e.g., a finger) may be excluded from the at least one object related to density calculation.

According to an embodiment, the electronic device may display the augmented reality content including at least one object on a display (e.g., the display module 160 of FIG. 2). According to one embodiment, the display module 160 may include a head mounted display.

According to an embodiment, the electronic device may identify a density of at least one object on the augmented reality content being displayed on the display. For example, when performing operation 901, the electronic device may identify the number of at least one object on the augmented reality content as the density. As another example, the electronic device may identify the density based further on the size of the at least one object on the augmented reality content. The electronic device may identify that the density is higher as the number of the at least one object on the augmented reality content increases or the size of the at least one object on the augmented reality content is smaller.

In operation 903, the electronic device may determine whether the identified density is greater than or equal to a threshold value. According to an embodiment, the electronic device may perform operation 905 when it is determined that the density is greater than or equal to the threshold value, and perform operation 907 when it is determined that the density is less than the threshold value.

In operation 905, the electronic device may recognize a first selected point. According to an embodiment, the first selected point may refer to a selected point recognized when the electronic device performs operations 303 through 307 of FIG. 3, and operation 905 may include operations 303 through 307 of FIG. 3. In an embodiment, operation 301 may also be included. In another embodiment, operation 301 may be performed in advance of operation 903.

According to an embodiment, the first selected point may be a selected point moved from the first reference point by a first correction value. Because the first correction value and the first reference point have been described above, duplicate descriptions will be omitted or simplified.

According to an embodiment, the first reference point is a virtual point displayed on the augmented reality content or a menu of a home screen of the augmented reality content when the electronic device performs the dominant eye determination operation (e.g., operation 301 of FIG. 3), but is not limited thereto.

According to an embodiment, the first correction value may be a value set in advance based on dominant eye correction information stored in a memory of the electronic device (e.g., the memory 130 of FIG. 2). As described above, the dominant eye correction information may be a value stored in the memory in the form of a table or a linked list as a correction value that varies according to the dominant eye and eye dominance degree by the electronic device. The table or linked list may be information in which different correction values are mapped according to the dominant eye and the eye dominance degree.

According to an embodiment, the electronic device may determine, as the first correction value, a correction value corresponding to the dominant eye and eye dominance degree of the user obtained when the electronic device performs the dominant eye determination operation in the table. According to an embodiment, the electronic device may store the determined first correction value in a memory.

According to an embodiment, the electronic device may determine the first correction value further based on a distance from the first position to the second position of the first object. Here, the first object may be, for example, a user's finger, and the electronic device may identify the position of the first object based on the user's fingertip (e.g., the tip of a fingernail) using a camera module. The first position may refer to a position of the first object identified by the camera module when the electronic device performs the dominant eye determination operation, and the second position may refer to a position of the first object identified by the camera module when a user points to a certain second object to select an object on the augmented reality content after the electronic device has performed the dominant eye determination operation.

In operation 907, the electronic device may recognize a second selected point. According to an embodiment, the second selected point may refer to a selected point recognized by the electronic device without performing operations 303 to 307 of FIG. 3. In an embodiment, operation 301 may also be omitted. In another embodiment, operation 301 may be performed in advance of operation 903, to prepare for the possibility that operation 905 may be performed instead.

According to an embodiment, the electronic device may recognize, as the second selected point, a point where the object is located on an extension line passing from the second reference point to the second position of the first object. For example, when a plurality of objects exist on the extension line, the electronic device may recognize a point where an object having the closest distance from the second reference point is located as a second selected point, or a point where the largest object among the plurality of objects is located as a second selected point. Because the second reference point and the second position of the first object have been described above, duplicate descriptions will be omitted or simplified.

According to an embodiment, the second reference point may be the center of the head mounted display of the electronic device.

According to the above-described embodiment, the electronic device may correct a position which the user points to based on the result of determining the user's dominant eye and then accurately select a second object the user wants to select when the density of at least one object on the augmented reality content is greater than or equal to a threshold value, and quickly select the second object based on the position of the user's finger without a correction operation for the position which the user points to when the density of at least one object on the augmented reality content is less than a threshold value.

As can be seen above, operation 905 (e.g., operations 303 through 307 of FIG. 3) to recognize a first selected point may be selectively executed based on the density of the at least one object, and operation 907 to recognize a second selected point may be alternatively executed when the density is lower than the threshold value.

Hereinafter, operations of the electronic device shown in FIG. 9 will be described with reference to FIGS. 10A and 10B as examples.

Figure 10A:
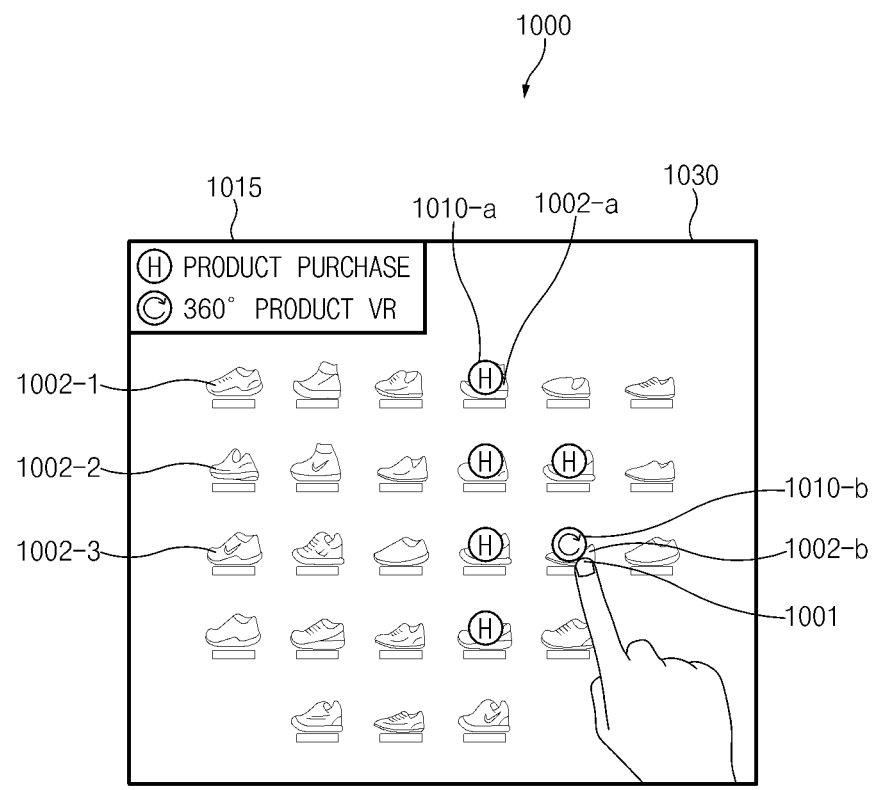
FIGS. 10A and 10B are diagrams illustrating example executions of a method for operating an electronic device according to an embodiment.
Figure 10B:
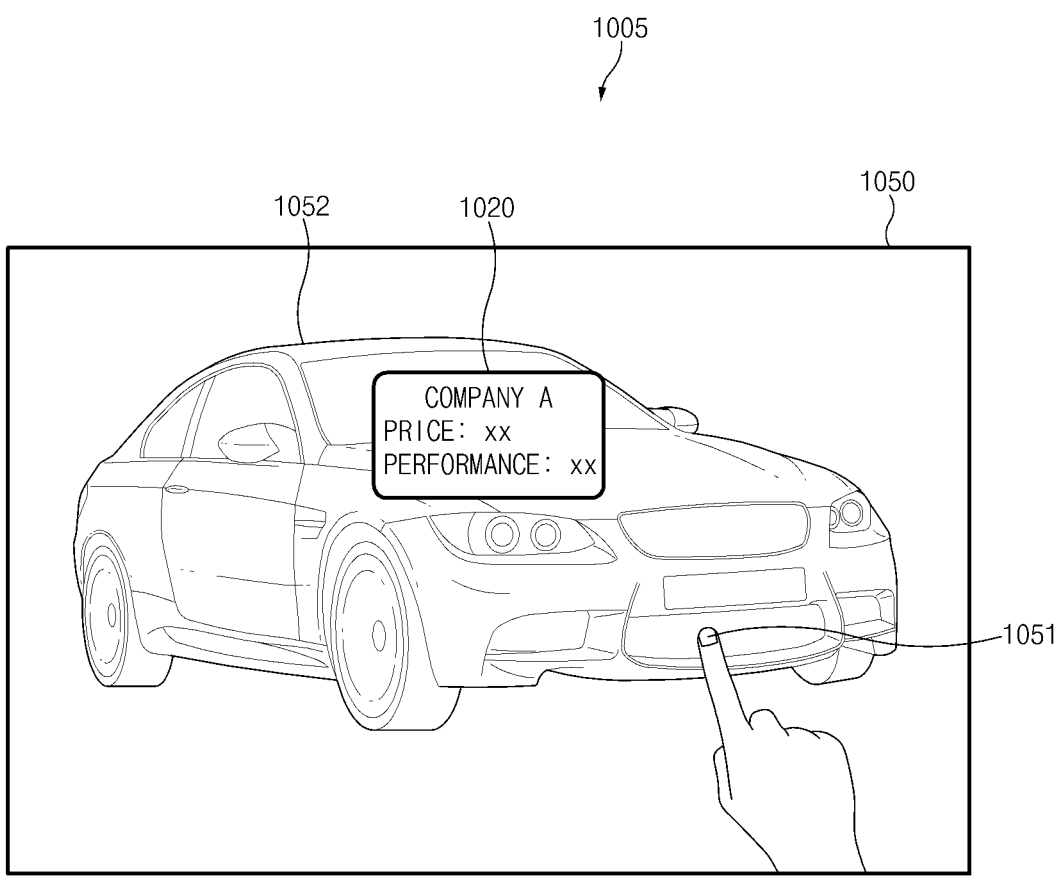

FIGS. 10A and 10B are diagrams 1000 and 1005 illustrating example executions of a selected point recognition operation of an electronic device according to an embodiment. The operations of the electronic device to be described below may be performed by the electronic device 201 of FIG. 2, or by the processor 120 of the electronic device 201.

According to an embodiment, the electronic device may identify a density of at least one object on augmented reality content being displayed on a display (e.g., the display module 160 of FIG. 2). For example, the electronic device may identify the density based on at least one of the number and size of the at least one object on the augmented reality content. According to an embodiment, the first object 1001 or 1051 may be excluded from the at least one object related to density calculation. The first object 1001 or 1051 may be, for example, a user's finger as a part of the user's body.

Referring to FIG. 10A, the electronic device may display the augmented reality content on a display 1030. The augmented reality content may include at least one object (1002-1, 1002-2, 1002-3, . . . ).

For example, the electronic device may determine that the identified density is greater than or equal to a threshold value based on the number and size of at least one object (1002-1, 1002-2, 1002-3, . . . ) on the augmented reality content. For example, the electronic device may determine that the density is greater than or equal to the threshold value when the at least one object on the augmented reality content satisfies at least one of a condition that the number of the at least one object is a certain number or more or a condition that the size of the at least one object is less than a certain size, and determine that the density is less than the threshold value when the at least one object on the augmented reality content satisfies at least one of a condition that the number of the at least one object is less than the certain number or a condition that the size of the at least one object is greater than or equal to the certain size.

According to an embodiment, the electronic device may recognize a first selected point when it is determined that the density is greater than or equal to a threshold value (operation 905). According to an embodiment, the electronic device may perform operations 303 to 307 of FIG. 3 when it is determined that the density is greater than or equal to the threshold value, and recognize a point moved from the first reference point by the first correction value as the first selected point.

According to an embodiment, the electronic device may recognize the first selected point when it is determined that the density is greater than or equal to the threshold value, and select a second object 1002-a or 1002-b on the augmented reality content corresponding to the first selected point.

According to an embodiment, when the density is equal to or greater than the threshold value, the electronic device may display a first UI (user interface) 1010-a or 1010-b superimposed on the selected second object 1002-a or 1002-b when the second object 1002-a or 1002-b on the augmented reality content corresponding to the first selected point is selected. The first UI 1010-a or 1010-b may be, for example, an icon representing information on the second object 1002-a or 1002-b on the selected augmented reality content.

According to an embodiment, as the density of at least one object on the augmented reality content increases, the first UI 1010-a or 1010-b may have a size smaller than a UI displayed when the second object on augmented reality content having a relatively low density is selected, and include more simplified information, to prevent crowding and prevent the at least one object having the increased density from being unnecessarily concealed.

According to various embodiments, when the density is greater than or equal to the threshold value, the electronic device may further display a second UI 1015 including a list of the first UIs 1010-a or 1010-b on the augmented reality content. The second UI 1015 may include a list of at least one icon capable of being displayed to be superimposed on the second object and a text description for the icon when the second object on the augmented reality content is selected. According to an embodiment, the electronic device may display the second UI 1015 so as not to be superimposed on the second object on the augmented reality content, and when the second object on the augmented reality content is selected, display the first UI 1010-a, or 1010-b to be superimposed on the selected second object.

Referring to FIG. 10B, the electronic device may display the augmented reality content on a display 1050. The augmented reality content may include at least one object 1052.

For example, the electronic device may determine that the identified density is less than a threshold value based on at least one of the number and size of the at least one object 1052 on the augmented reality content. According to an embodiment, the electronic device may recognize a second selected point when it is determined that the density is less than the threshold value (operation 907). According to an embodiment, the electronic device need not perform operations 303 through 307 of FIG. 3 when it is determined that the density is less than the threshold value, and may recognize a point on an extension line passing from the second reference point to the position of the first object 1051 as a second selected point.

According to an embodiment, the electronic device may recognize the second selected point when it is determined that the density is less than the threshold value, and select the second object 1052 on the augmented reality content corresponding to the second selected point.

According to an embodiment, when the density is less than the threshold value, the electronic device may display a third UI 1020 to be superimposed on the selected object 1052 as the second object 1052 on the augmented reality content corresponding to the second selected point is selected. The third UI 1020 may include, for example, text representing information on the selected second object 1052 on the augmented reality content. For example, when the selected second object 1052 is a product to be sold, the third UI 1020 displayed by the electronic device may include text representing price information and performance information.

According to an embodiment, as the density of at least one object on the augmented reality content decreases, the UI displayed when the second object is selected may have a larger size and include a greater amount of information. Accordingly, the third UI 1020 may have a larger size and include more specific information than a UI displayed when the second object on augmented reality content having a relatively high density is selected. According to the above-described embodiment, when at least one object on the augmented reality content has a relatively large number or small size, the electronic device may identify a density of at least one object on the augmented reality content as relatively high. In the embodiment with reference to FIG. 10A, the electronic device may exactly select the second object 1002-*a* or 1002-*b* on the augmented reality content that the user wants to select by correcting a point which the first object 1001 points to, based on the user's dominant eye, when it is determined that the density is greater than or equal to the threshold value. In the embodiment with reference to FIG. 10B, the electronic device need not perform a correction operation based on the user's dominant eye when it is determined that the density is less than the threshold value, and may quickly select the second object 1052 on the augmented reality content by determining the position which the first object 1051 points to, based on the position of the first object 1051.

According to an embodiment disclosed herein, an electronic device (the electronic device 101 of FIG. 1 or the electronic device 201 of FIG. 1) may include a first camera module (the camera module 180 of FIG. 1 or the camera module 180 of FIG. 2), a display (the display module 160 of FIG. 1 or the display module 160 of FIG. 2) that displays an augmented reality content, at least one processor (the processor 120 of FIG. 1 or the processor 120 of FIG. 2) operatively connected to the first camera module and the display, and a memory (the memory 130 of FIG. 1 or the memory 130 of FIG. 2) operatively connected to the at least one processor and configured to store instructions and dominant eye correction information. The at least one processor is configured to execute the instructions to perform a dominant eye determination operation of determining a dominant eye of a user of the electronic device, identify a first position of a first object during the dominant eye determination operation, identify a second position of the first object by using the first camera module, recognize, as a selected point, a point moved by a first correction value from a first reference point displayed on the augmented reality content during the dominant eye determination operation, the first correction value determined based on the dominant eye correction information, and select a second object on the augmented reality content corresponding to the selected point.

According to an embodiment disclosed herein, when the dominant eye determination operation is performed, the processor may be further configured to execute the instructions to display the first reference point on the augmented reality content, identify the first position of the first object pointing to the first reference point using the first camera module, and determine the dominant eye of the user of the electronic device based on the first position.

According to an embodiment disclosed herein, the processor may be further configured to execute the instructions to determine the first correction value further based on a distance from the first position to the second position when determining the first correction value.

According to an embodiment disclosed herein, the processor may be further configured to execute the instructions to determine the first correction value further based on a depth of the second object when determining the first correction value.

According to an embodiment disclosed herein, the electronic device may further include a second camera module (the camera module 180 of FIG. 1, the camera module 180 of FIG. 2 or the eye tracking camera 213 of FIG. 2), and the processor may be further configured to execute the instructions to determine the depth of the second object based on a size of a pupil of the user of the electronic device, the size of the pupil being detected by the second camera module.

According to an embodiment disclosed herein, the first object may be a finger of the user of the electronic device.

According to an embodiment disclosed herein, the processor may be further configured to execute the instructions to identify at least one of the first position and the second position of the first object using a center of a head mounted display of the electronic device as a reference point.

According to an embodiment disclosed herein, the processor may be further configured to execute the instructions to identify a density of at least one object on the augmented reality content, and selectively recognize, as the selected point, based on the identified density, one of a first selected point that is a point moved from the first reference point by the first correction value, and a second selected point that is a point on an extension line passing from a second reference point to the second position.

According to an embodiment disclosed herein, the processor may be further configured to execute the instructions to recognize the first selected point as the selected point based on the identified density being greater than or equal to a threshold value, and recognize the second selected point as the selected point based on the identified density being less than the threshold value.

According to an embodiment disclosed herein, the processor may be further configured to execute the instructions to display a first user interface (UI) according to selection of the second object based on the identified density being greater than or equal to a threshold value, and display a second UI having a larger size than the first UI according to selection of the second object, based on the identified density being less than the threshold value.

According to an embodiment disclosed herein, an operation method of an electronic device (the electronic device 101 of FIG. 1 or the electronic device 201 of FIG. 2) for providing augmented reality content may include determining a dominant eye of a user of the electronic device, and identifying a first position of a first object when determining the dominant eye, identifying a second position of the first object by using a first camera module (the camera module 180 of FIG. 1 or the camera module 180 of FIG. 2), recognizing, as a selected point, a point moved by a first correction value from a first reference point displayed on the augmented reality content when determining the dominant eye, the first correction value being determined based on dominant eye correction information stored in a memory (the memory 130 of FIG. 1 or the memory 130 of FIG. 2), and selecting a second object on the augmented reality content corresponding to the selected point.

According to an embodiment disclosed herein, the determining of the dominant eye may include displaying the first reference point on the augmented reality content, identifying the first position of the first object pointing to the first reference point using the first camera module, and determining the dominant eye of the user of the electronic device based on the first position.

According to an embodiment disclosed herein, the operation method may further include determining the first correction value, and the first correction value may be determined further based on a distance from the first position to the second position.

According to an embodiment disclosed herein, the first correction value may be determined further based on a depth of the second object.

According to an embodiment disclosed herein, the determining of the first correction value may include determining the depth of the second object based on a size of a pupil of the user of the electronic device detected by a second camera module (the camera module 180 of FIG. 1, the camera module 180 of FIG. 2 or the eye tracking camera 213 of FIG. 2).

According to an embodiment disclosed herein, the first object may be a finger of the user of the electronic device.

According to an embodiment disclosed herein, at least one of the first position and the second position of the first object may be identified using a center of a head mounted display of the electronic device as a reference point.

According to an embodiment disclosed herein, the operation method may further include identifying a density of at least one object on the augmented reality content, and the selected point may be selectively recognized, based on the identified density, as one of a first selected point that is a point moved from the first reference point by the first correction value, and a second selected point that is a point on an extension line passing from a second reference point to the second position.

According to an embodiment disclosed herein, the first selected point may be recognized as the selected point based on the identified density being greater than or equal to a threshold value, and the second selected point may be recognized as the selected point based on the identified density being less than the threshold value.

According to an embodiment disclosed herein, the operation method may further include displaying a first user interface (UI) according to selection of the second object based on the identified density being greater than or equal to a threshold value, and displaying a second UI larger than the first UI according to selection of the second object, based on the identified density being less than the threshold value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a first camera;
    a display configured to display an augmented reality content;
    at least one processor operatively connected to the first camera and the display; and
    a memory operatively connected to the at least one processor and configured to store instructions and dominant eye correction information, wherein the at least one processor is configured to execute the instructions to:
        control the display to display a first reference point on the augmented reality content;
        identify a first position of a first object pointing to the first reference point using the first camera;
        determine a dominant eye of a user of the electronic device based on the first position;
        identify a second position of the first object moved from the first position, by using the first camera;
        recognize a selected point moved by a first correction value from the first reference point, the first correction value being determined based on the dominant eye of the user and the dominant eye correction information; and
        select a second object on the augmented reality content corresponding to the selected point.

2. The electronic device of claim 1, wherein the at least one processor is further configured to execute the instructions to determine the first correction value further based on a distance from the first position to the second position.

3. The electronic device of claim 2, wherein the at least one processor is further configured to execute the instructions to determine the first correction value further based on a depth of the second object.

4. The electronic device of claim 3, further comprising a second camera,
    wherein the at least one processor is further configured to execute the instructions to determine the depth of the second object based on a size of a pupil of the user of the electronic device, the size of the pupil being detected by the second camera.

5. The electronic device of claim 1, wherein the first object is a finger of the user of the electronic device.

6. The electronic device of claim 1, wherein the at least one processor is further configured to execute the instructions to identify at least one of the first position and the second position of the first object using a center of the display of the electronic device as a reference point.

7. The electronic device of claim 1, wherein the at least one processor is further configured to execute the instructions to:
    identify a density of at least one object on the augmented reality content; and
    selectively recognize, as the selected point, based on the identified density, one of:
        a first selected point moved from the first reference point by the first correction value, and
        a second selected point on an extension line passing from a second reference point to the second position.

8. The electronic device of claim 7, wherein the at least one processor is further configured to execute the instructions to:
    recognize the first selected point as the selected point based on the identified density being greater than or equal to a threshold value; and
    recognize the second selected point as the selected point based on the identified density being less than the threshold value.

9. The electronic device of claim 7, wherein the at least one processor is further configured to execute the instructions to:
    control the display to display a first user interface (UI) according to selection of the second object, based on the identified density being greater than or equal to a threshold value; and
    control the display to display a second UI larger than the first UI according to selection of the second object, based on the identified density being less than the threshold value.

10. A operation method of an electronic device for providing augmented reality content, comprising:
    displaying a first reference point on the augmented reality content on a display;
    identifying a first position of a first object pointing to the first reference point using a first camera;
    determining a dominant eye of a user of the electronic device based on the first position;
    identifying a second position of the first object moved from the first position, by using the first camera;
    recognizing a selected point moved by a first correction value from the first reference point, the first correction value being determined based on the dominant eye of the user and dominant eye correction information stored in a memory; and
    selecting a second object on the augmented reality content corresponding to the selected point.

11. The operation method of claim 10, further comprising determining the first correction value,
    wherein the first correction value is determined further based on a distance from the first position to the second position.

12. The operation method of claim 11, wherein the first correction value is determined further based on a depth of the second object.

13. The operation method of claim 12, wherein the determining of the first correction value includes determining the depth of the second object based on a size of a pupil of the user of the electronic device detected by a second camera.

14. The operation method of claim 10, wherein the first object is a finger of the user of the electronic device.

15. The operation method of claim 10, wherein at least one of the first position and the second position of the first object is identified using a center of the display of the electronic device as a reference point.

16. The operation method of claim 10, further comprising identifying a density of at least one object on the augmented reality content, wherein the selected point is selectively recognized, based on the identified density, as one of a first selected point moved from the first reference point by the first correction value, and a second selected point on an extension line passing from a second reference point to the second position.

17. The operation method of claim 16, wherein the first selected point is recognized as the selected point based on the identified density being greater than or equal to a threshold value, and wherein the second selected point is recognized as the selected point based on the identified density being less than the threshold value.

18. The operation method of claim 16, further comprising:

displaying a first user interface (UI) according to selection of the second object, based on the identified density being greater than or equal to a threshold value on the display; and display a second UI larger than the first UI according to selection of the second object, based on the identified density being less than the threshold value on the display.

* * * * *